United States Patent
Mizuguchi et al.

(10) Patent No.: US 10,999,245 B2
(45) Date of Patent: May 4, 2021

(54) COMMUNICATION PATH CONTROL METHOD, COMMUNICATION PATH CONTROL DEVICE, AND COMMUNICATION PATH CONTROL PROGRAM THAT DIVIDE A PATH LEADING TO A NETWORK THAT ACCOMMODATES A SPECIFIC DEVICE INTO A PATH THAT PASSES THROUGH A FILTER DEVICE AND A PATH THAT DOES NOT PASS THROUGH A FILTER DEVICE

(71) Applicant: NTT Communications Corporation, Chiyoda-ku (JP)

(72) Inventors: Takanori Mizuguchi, Tokyo (JP); Kento Ikeda, Tokyo (JP); Junya Kato, Tokyo (JP); Kaname Nishizuka, Tokyo (JP); Masashi Sakurada, Tokyo (JP)

(73) Assignee: NTT Communications Corporation, Chiyoda-ku (JP)

( * ) Notice: Subject to any disclaimer, the term of this patent is extended or adjusted under 35 U.S.C. 154(b) by 104 days.

(21) Appl. No.: 15/578,095

(22) PCT Filed: Feb. 29, 2016

(86) PCT No.: PCT/JP2016/056133
§ 371 (c)(1),
(2) Date: Nov. 29, 2017

(87) PCT Pub. No.: WO2016/194422
PCT Pub. Date: Dec. 8, 2016

(65) Prior Publication Data
US 2018/0152416 A1 May 31, 2018

(30) Foreign Application Priority Data
Jun. 1, 2015 (JP) ............................. JP2015-111340

(51) Int. Cl.
*H04L 29/06* (2006.01)
*H04L 12/66* (2006.01)
(Continued)

(52) U.S. Cl.
CPC .......... *H04L 63/0236* (2013.01); *H04L 12/66* (2013.01); *H04L 45/586* (2013.01);
(Continued)

(58) Field of Classification Search
CPC ............. H04L 45/125; H04L 12/40163; H04L 63/0227; H04L 47/10; H04L 63/0236;
(Continued)

(56) References Cited

U.S. PATENT DOCUMENTS

| 6,920,493 B1 * | 7/2005 | Schwab | ................ H04L 63/104 370/230 |
| 7,092,357 B1 * | 8/2006 | Ye | .......................... H04L 47/10 370/230 |

(Continued)

FOREIGN PATENT DOCUMENTS

| JP | 2007-129482 A | 5/2007 |
| JP | 2014-504111 A | 2/2014 |

(Continued)

OTHER PUBLICATIONS

Extended European Search Report dated Dec. 3, 2018 in Patent Application No. 16802861.1, 8 pages.
(Continued)

*Primary Examiner* — Bryan F Wright
(74) *Attorney, Agent, or Firm* — Oblon, McClelland, Maier & Neustadt, L.L.P.

(57) ABSTRACT

A communication controller performs route control in a communication system comprising a specific network, a first network configured to accommodate a specific device connected to the specific network, a second network provided
(Continued)

between the specific network and the first network, and a filter configured to restrict communication according to a predetermined condition. The communication controller device includes: a route-setting device which controls the path such that a first path of the branched path is set as a path leading to a predetermined address space including an address of the specific device via the filter, and a second path of the branched path is set as a path leading to the first network in which the predetermined address space is excluded from an address space of the first network.

13 Claims, 13 Drawing Sheets

(51) Int. Cl.
　　　*H04L 12/713* 　　(2013.01)
　　　*H04L 12/813* 　　(2013.01)
　　　*H04L 12/707* 　　(2013.01)

(52) U.S. Cl.
　　　CPC .......... *H04L 47/20* (2013.01); *H04L 63/1458* (2013.01); *H04L 45/22* (2013.01); *H04L 63/0272* (2013.01)

(58) Field of Classification Search
　　　CPC ....... H04L 45/586; H04L 47/20; H04L 12/66; H04L 45/22; H04L 63/0272
　　　USPC .......................................................... 726/13
　　　See application file for complete search history.

(56) References Cited

U.S. PATENT DOCUMENTS

| | | | | |
|---|---|---|---|---|
| 7,735,116 | B1* | 6/2010 | Gauvin | G06F 21/552 |
| | | | | 726/2 |
| 8,176,561 | B1* | 5/2012 | Hurst | H04L 63/1433 |
| | | | | 726/25 |
| 2006/0133275 | A1* | 6/2006 | Dabagh | H04L 63/0227 |
| | | | | 370/230 |
| 2006/0182034 | A1* | 8/2006 | Klinker | H04L 43/00 |
| | | | | 370/238 |
| 2012/0174196 | A1 | 7/2012 | Bhogavilli et al. | |
| 2013/0208599 | A1* | 8/2013 | Mashimo | H04L 45/125 |
| | | | | 370/238 |
| 2013/0339545 | A1* | 12/2013 | Shenoi | H04L 12/40163 |
| | | | | 709/240 |

FOREIGN PATENT DOCUMENTS

| | | | |
|---|---|---|---|
| JP | 2014-229982 A | 12/2014 | |
| WO | 2012/091992 A1 | 7/2012 | |

OTHER PUBLICATIONS

I. Gashinsky Yahoo!, et al., "Operational Neighbor Discovery Problems; rfc6583.txt", Operational Neighbor Discovery Problems; RFC6583.TXT, Internet Engineering Task Force, IETF; Standard, Internet Society (ISOC) 4, Rue Des Falaises CH-1205 Geneva, Switzerland, XP015081484, Mar. 27, 2012, pp. 1-12.

Sharad Agarwal, et al., "DDoS Mitigation via Regional Cleaning Centers," Sprint ATL Research Report RR04-ATL-013177, [retrieval date Mar. 25, 2016], InternetURL:http://mediatools_cs.uci.ac.uk/nets/dos/export/1446/endtoend/paper/relatedwork/RR04-ATL-013177.pdf, Jan. 2004, (11 pages).

International Search Report dated Apr. 12, 2016 in PCT/JP2016/056133 filed Feb. 29, 2016.

Japanese Office Action dated Apr. 12, 2016 in JP 2015-111340 filed Jun. 1, 2015 (with English translation).

* cited by examiner

COMMUNICATION PATH CONTROL METHOD, COMMUNICATION PATH CONTROL DEVICE, AND COMMUNICATION PATH CONTROL PROGRAM THAT DIVIDE A PATH LEADING TO A NETWORK THAT ACCOMMODATES A SPECIFIC DEVICE INTO A PATH THAT PASSES THROUGH A FILTER DEVICE AND A PATH THAT DOES NOT PASS THROUGH A FILTER DEVICE

TECHNICAL FIELD

The present invention relates to a communication control method, a communication control device, and a program.

Priority is claimed on Japanese Patent Application No. 2015-111340, filed Jun. 1, 2015, the content of which is incorporated herein by reference.

BACKGROUND ART

In communication systems connected to public networks such as the Internet, communication functions deteriorate due to concentration of aggressive communication in some cases. On the other hand, a technique of reducing deterioration of a communication function due to concentration of aggressive communication is known (refer to Patent Document 1).

Patent Document 1 discloses carrying out countermeasures of reducing the influence of a distributed denial-of-service (DDoS) attack in one Internet service provider (ISP) in the case of communication of a multi-home user network with a plurality of ISPs.

CITATION LIST

Patent Literature

Patent Literature 1

Japanese Unexamined Patent Application, First Publication No. 2014-229982

SUMMARY OF INVENTION

Technical Problem

However, in the technique disclosed in Patent Document 1, it is necessary for an attack countermeasure device to perform a process required for the countermeasures on all of the communication included in an address space designated by routing information exchanged between the ISPs, and a load of a process at a time of countermeasures in the attack countermeasure device increases. When traffic of processing capability of the attack countermeasure device or more occurs and the like, the process stagnates, and thus a delay of a packet to be forwarded increases in some cases.

The present invention was made in view of the above-described circumstances, and an objective thereof is to provide a technique of improving the convenience of a communication system.

Solution to Problem

An aspect of the present invention is a communication control method which performs route control in a communication system including: a specific network; a first network configured to accommodate a specific device connected to the specific network; a second network provided between the specific network and the first network; and a filter device configured to restrict communication according to a predetermined condition, the communication control method including: causing a communication control device in the communication system to execute a communication route-setting process of, in accordance with routing information defining a path leading from the specific network side to the first network to be branched in the second network, controlling the path such that a first path of the branched path is set as a path leading to a predetermined address space including an address of the specific device via the filter device, and a second path of the branched path is set as a path leading to the first network in which the predetermined address space is excluded from an address space of the first network.

An aspect of the present invention is the communication control method which may include: a process of accommodating the filter device in a third network provided in the first path and causing the communication control device to perform control so that the communication leading to the specific device via the first path leads to the filter device.

An aspect of the present invention is the communication control method which may include: a process of accommodating the filter device in the second network and causing the communication control device to perform control so that the communication leading to the specific device via the first path leads to the filter device.

An aspect of the present invention is the communication control method which may include: in the communication route-setting process, a process of causing the communication control device to output the following two types of routing information using a routing protocol configured to control a path between the specific network and the first network, wherein first routing information includes address information indicating address space of the first network, and second routing information includes address information indicating a predetermined address space set to be narrower than the address space of the first network.

An aspect of the present invention is the communication control method in which the first routing information may include information used to designate a forwarding destination so that a packet received from the specific network is forwarded from the second network to a gateway belonging to a network different from a network in which the filter device is provided, and the second routing information may include information used to designate a forwarding destination so that the received packet is forwarded to the filter device.

An aspect of the present invention is the communication control method in which the first routing information and the second routing information may be transmitted from the third network provided in the first path.

An aspect of the present invention is the communication control method in which whether the second routing information is advertised on another network via the second network may be selected in accordance with a network of a connection destination of the second network.

An aspect of the present invention is the communication control method which may include: a process of setting the route using information indicating a transmission source of the routing information as the first network.

An aspect of the present invention is the communication control method in which a tunnel may be formed between the first network and the network in which the filter device is provided and a packet for communication via the filter device provided in the first path may be forwarded from the third network to the first network via the tunnel.

An aspect of the present invention is the communication control method in which the network different from the network in which the filter device is provided may be a network included in the second path leading to the first network.

An aspect of the present invention is the communication control method in which, when the first network and the second network are connected to each other via another network, information used to designate another network located between the first network and the second network may be added to the routing information.

An aspect of the present invention is a communication control device which performs route control in a communication system including: a specific network; a first network configured to accommodate a specific device connected to the specific network; a second network provided between the specific network and the first network; and a filter device configured to restrict communication according to a predetermined condition, the communication control device including: a route-setting device which, in accordance with routing information defining a path leading from the specific network side to the first network to be branched in the second network, controls the path such that a first path of the branched path is set as a path leading to a predetermined address space including an address of the specific device via the filter device, and a second path of the branched path is set as a path leading to the first network in which the predetermined address space is excluded from an address space of the first network.

An aspect of the present invention is a program causing a computer of a communication system including: a specific network; a first network configured to accommodate a specific device connected to the specific network; a second network provided between the specific network and the first network; and a filter device configured to restrict communication according to a predetermined condition to execute a step of controlling a path in which, in accordance with routing information defining a path leading from the specific network side to the first network to be branched in the second network, the path is controlled such that a first path of the branched path is set as a path leading to a predetermined address space including an address of the specific device via the filter device, and a second path of the branched path is set as a path leading to the first network in which the predetermined address space is excluded from an address space of the first network.

An aspect of the present invention is a communication control method which controls a packet leading from the Internet to a first network using a routing protocol in a network including: the first network configured to accommodate a specific device which communicates with the Internet; a second network provided between the Internet and the first network; and a third network including a filter device configured to restrict communication according to a predetermined condition, connected to the second network, and configured to form a tunnel with the first network, the communication control method including: a step of advertising, on the second network, first routing information including information used to designate a forwarding destination of a packet, a destination of which belongs to an address space of the first network for a network different from the third network; and a step of advertising, on the second network, second routing information including information used to designate a forwarding destination of a packet, a destination of which belongs to an address space which is narrower than the address space of the first network and includes an address of the specific device, for the third network.

An aspect of the present invention is a program causing a computer to execute any one of the communication control methods described above.

Advantageous Effects of Invention

According to the present invention, the convenience of a communication system can be improved.

DESCRIPTION OF EMBODIMENTS

A communication system according to embodiments will be described with reference to the drawings.

First Embodiment

Figure 1:
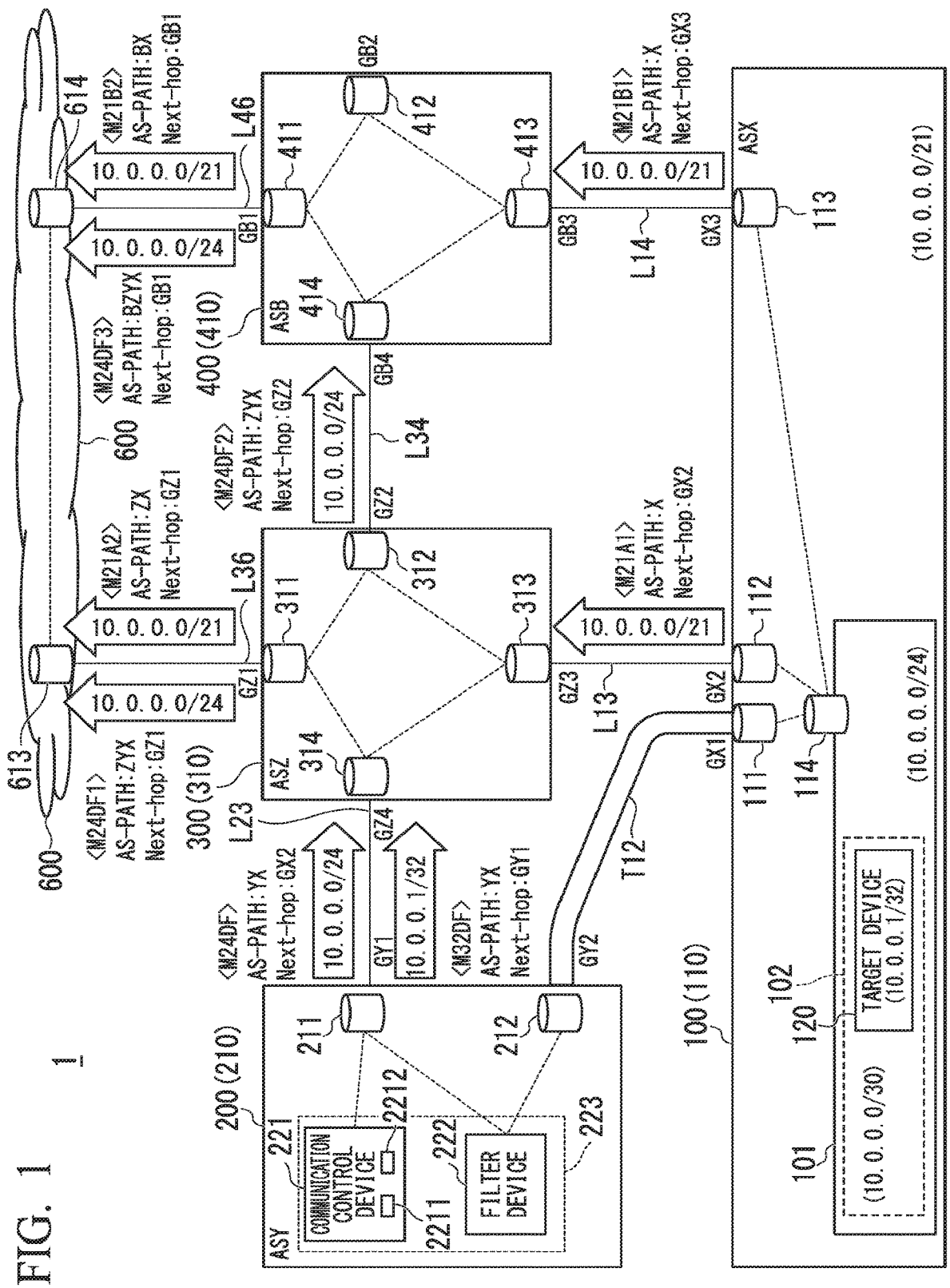
FIG. 1 is a constitution diagram of a communication system according to a first embodiment.

FIG. 1 is a constitution diagram of a communication system according to an embodiment. An overview of the communication system according to the embodiment will be described below.

In the following description, the communication system according to the embodiment will be described by exemplifying a case in which a distributed denial-of-service (DDoS) attack or a denial-of-service (DoS) attack on a communication device (a target device or a specific device) in a network (a first network) managed by a user who uses the Internet is reduced using a network (a second network) managed by a specific Internet service provider (ISP).

A specific network constituting the Internet is connected to the network (the first network) of the user through another network. A specific device configured to perform communication over the Internet is accommodated in a predetermined address space in the network of the user. Examples of the other network may include a network managed by the specific ISP provided in a communication path between the specific network constituting the Internet and the network of the user.

However, a border gateway protocol (BGP) (BGP-4) is used for a routing protocol in the Internet. When an address space designated by the ISP for routing information is drawn into an attack countermeasure device through routing by the BGP, it is necessary for the address space to be an Internet protocol (IP) address space larger than an IP address space designated as "/24" if the address space is an IP version 4 (IPv4) address or an IP address space larger than an IP address space designated as "/48" if the address space is an IPv6 address in many cases. An IP address cannot be controlled in smaller devices with only the routing information designated described above. For this reason, even when traffic addressed to an IP address of a defense target is restricted, traffic addressed to an IP address other than the IP address also needs to pass through the attack countermeasure device, and thus a processing load on the attack countermeasure device increases and a large delay occurs in traffic to the network of the user in some cases.

In the embodiment, a communication control method is provided for reducing the influence of aggressive communication by a filter device configured to restrict communication according to a predetermined condition using the fact that communication between the specific network constituting the Internet and the network of the user is configured such that routing is performed through a BGP serving as a common routing protocol.

In the network (the second network) managed by the specific ISP, a communication path leading from the specific network constituting the Internet to the network (the first network) of the user is branched. A first path of the branched path is set as a path leading to the predetermined address space. A second path of the branched path is set as a path leading to the network of the user in which the predetermined address space is excluded from an address space of the network (the first network) of the user. The communication path is branched in accordance with routing information defining a path leading from the specific network side to the network (the first network) of the user to be branched in the network (the second network) managed by the specific ISP.

Also, a filter device 222 (a filter device) configured to restrict communication leading to the predetermined address space is provided in the first path. The filter device 222 restricts the communication leading to the predetermined address space via the first path when a predetermined constraint condition is satisfied and allows the communication leading to the predetermined address space via the first path when the constraint condition is not satisfied in accordance with control.

A more concrete example of the communication system constituted as described above will be described by way of example.

A communication system 1 shown in FIG. 1 includes an autonomous system (AS)X 110, an ASY 210, an ASZ 310, an ASB 410, and a network 600.

The network 600 is a specific network constituting the Internet and is constituted of one or more autonomous systems (ASs). The network 600 includes, for example, a router 613 and a router 614 and routing information is shared between routers including the router 613 and the router 614.

The ASX 110, the ASY 210, the ASZ 310, and the ASB 410 are ASs. The ASX 110, the ASY 210, the ASZ 310, and the ASB 410 correspond to a network 100, a network 200, a network 300, and a network 400.

It is assumed that the network 100 corresponding to the ASX 110 is identified by a network address (a prefix) "10.0.0.0/21." It is assumed that a network 101 is provided in the network 100 and the network 101 is identified by a network address (a prefix) "10.0.0.0/24." It is assumed that a network 102 is provided in the network 101 and the network 102 is identified by a network address (a prefix) "10.0.0.0/30."

For example, the ASX 110 includes a router 111, a router 112, a router 113, a router 114, and a target device 120.

The target device 120 is a communication device of an attack target which is a transmission destination of communication forming aggressive traffic. It is assumed that an IP address (a network address) in the network 101 is assigned to the target device 120, and for example, the address thereof is identified as "10.0.0.1/32."

The routers, i.e., the router 111, the router 112, the router 113, and the router 114, share routing information with each other and perform routing for communication in the ASX 110. Note that connection among the router 111, the router 112, the router 113, and the router 114 may have a constitution other than that illustrated in the drawings.

The router 111, the router 112, and the router 113 are connected to an external network and the router 112 and the router 113 advertise routing information on each AS corresponding to a network of a connection destination. For example, the router 112 is connected to the ASZ 310 via a logical path L13 in a port GX2. The router 113 is connected to the ASB 410 via a logical path L14 in a port GX3. The router 111 is connected to the ASY 210 via a tunnel T12 forming a logical path in a port GX1. Note that the tunnel T12 transparently relays an IP packet between the ASX 110 and the ASY 210 and may be configured to relay, for example, an encapsulated IP packet. The router 111 does not advertise routing information on the ASY 210. The router 114 performs routing for communication between the network 101 and a network other than the network 101 in the network 100.

The ASZ 310 includes a router 311, a router 312, a router 313, and a router 314. The router 311, the router 312, the router 313, and the router 314 are connected to an external network and advertise routing information on each AS corresponding to a network of a connection destination. For example, the router 313 is connected to the ASX 110 via the logical path L13 in a port GZ3. The router 311 is connected to the router 613 of the network 600 via a logical path L36 in a port GZ1. The router 312 is connected to the ASB 410 via a logical path L34 in a port GZ2. The router 314 is connected to the ASY 210 via a logical path L23 in a port GZ4.

The routers, i.e., the router 311, the router 312, the router 313, and the router 314, share routing information with each other and perform routing for communication in the ASZ 310. Note that connection among the router 311, the router 312, the router 313, and the router 314 may have a constitution other than that illustrated in the drawings.

The ASB 410 includes a router 411, a router 412, a router 413, and a router 414. The router 411, the router 412, the router 413, and the router 414 are connected to an external network and advertise routing information on each AS corresponding to a network of a connection destination. For example, the router 413 is connected to the ASX 110 via the logical path L14 in a port GB3. The router 411 is connected to the router 614 of the network 600 via a logical path L46 in a port GB1. The router 414 is connected to the ASZ 310 via the logical path L34 in a port GB4.

The routers, i.e., the router 411, the router 412, the router 413, and the router 414, share routing information with each other and perform routing for communication in the ASB 410. Note that connection among the router 411, the router 412, the router 413, and the router 414 may have a constitution other than that illustrated in the drawings.

The ASY 210 includes a router 211, a router 212, a communication control device 221, and the filter device 222. The router 211 and the router 212 are connected to the network 300 serving as an external network and advertise routing information on the ASZ 310 corresponding to the network 300 of a connection destination. For example, the router 211 is connected to the ASZ 310 via the logical path L23 in a port GY1. The router 212 is connected to the ASX 110 via the tunnel T12 forming a logical path in a port GY2. Note that, although a case in which the router 211 and the router 212 are configured to be separated is illustrated, the present invention is not limited to a constitution using an integrated device, and connection in the network 200 may have a constitution other than that illustrated in the drawings.

The communication control device 221 controls a communication path in the communication system 1 to reduce the influence of aggressive traffic. For example, the communication control device 221 includes a route-setting device 2211 and a communication control device 2212.

The route-setting device 2211 (the communication control device 221) controls the ASZ 310 to branch a communication path leading from the network 600 to the network 101 in the network 300 (a second network) which is on a communication path between the network 600 (a specific network) and the network 101 (a first network). The route-setting device 2211 (the communication control device 221) sets a first path of the branched path as a path leading to the network 102 assigned to a predetermined address space. Furthermore, the route-setting device 2211 (the communication control device 221) sets a second path of the branched path as a path leading to the network 101 in which an address space of the network 102 is excluded from an address space of the network 101. The route-setting device 2211 (the communication control device 221) adjusts a constitution of a communication path using the routing information defined as described above.

The filter device 222 configured to restrict the communication leading to the predetermined address space is provided on the first path, and the communication control device 2212 (the communication control device 221) controls the filter device 222 so that the communication leading to the predetermined address space via the first path is restricted using the filter device 222 when a predetermined constraint condition is satisfied and the communication leading to the predetermined address space via the first path is allowed when the constraint condition is not satisfied.

The filter device 222 is provided on the first path and restricts communication according to a predetermined condition. For example, on the first path, the filter device 222 is accommodated in the network 200 (a third network) provided between the network 300 (the second network) and the network 100 (the first network). The filter device 222 restricts communication leading to a predetermined address space corresponding to the network 102 via the first path when a predetermined constraint condition is satisfied and allows the communication leading to the predetermined address space corresponding to the network 102 via the first path when the constraint condition is not satisfied. The above-described processes in the filter device 222 may be configured to be realized in accordance with control from the communication control device 221.

Figure 2:
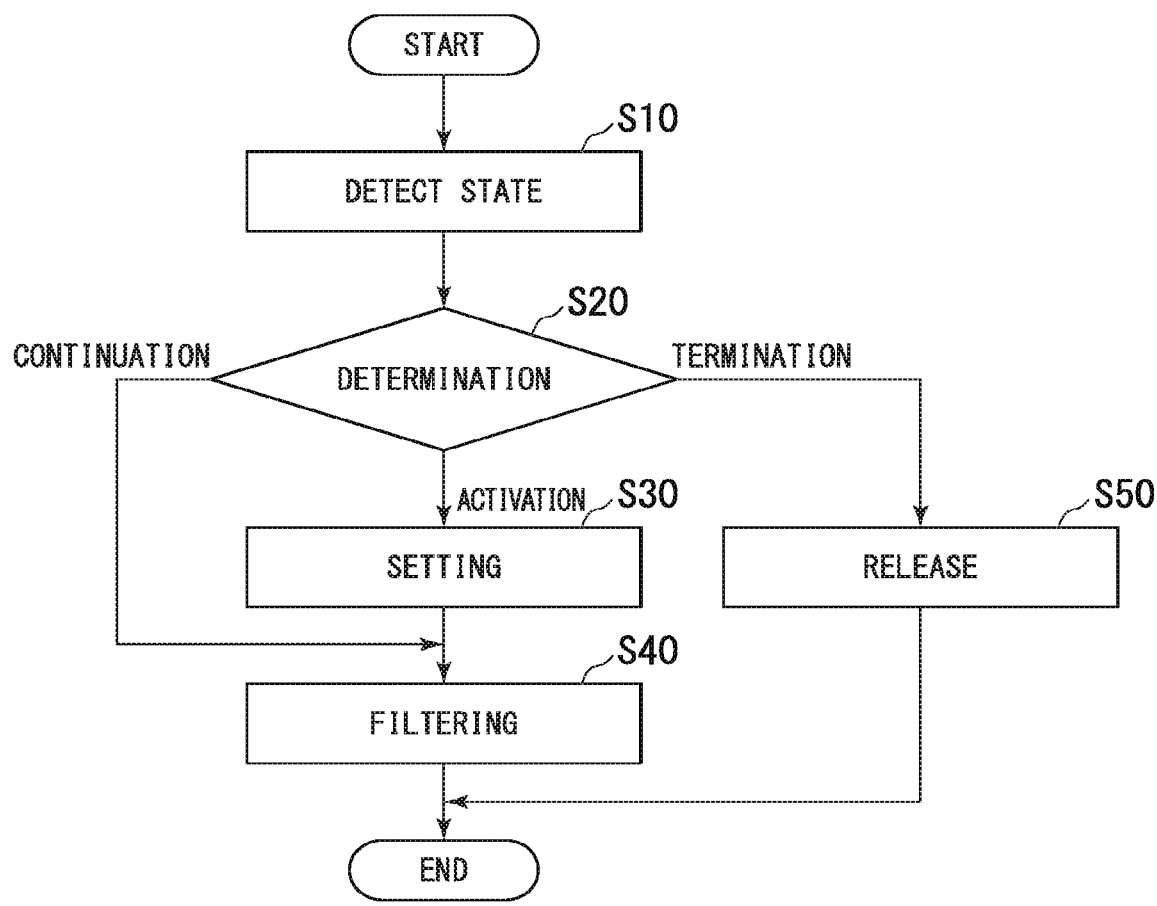
FIG. 2 is a flowchart describing a process of reducing traffic in the communication system.

Next, a function of the communication system configured as described above will be described with reference to FIGS. 1 to 4. FIG. 2 is a flowchart describing a procedure of a process of reducing aggressive communication traffic in the communication system according to the embodiment.

The communication control device 221 acquires data used for designating each communication state detected in the ASX 110 and data used for designating each communication state detected in the filter device 222 (Step S10). The communication control device 221 determines the communication state of the ASX 110 using the acquired data (Step S20). When abnormal traffic is detected through the determination of Step S20 and a countermeasure function is not activated, the communication control device 221 controls a state of the communication path of the filter device 222 and the ASZ 310 to activate the countermeasure function. Details of a method of activating the countermeasure function will be described (Step S30). The filter device 222 performs a filtering process of determining each packet supplied via the ASZ 310, restricting the packet when a predetermined constraint condition is satisfied, and allowing the packet when the constraint condition is not satisfied (Step S40).

On the other hand, when the countermeasure function is in operation and abnormal traffic continues to be detected through the determination of Step S20, the communication control device 221 causes the countermeasure function to continue through the process of Step S40.

Moreover, when the countermeasure function is in operation and abnormal traffic is not detected through the determination of Step S20, the communication control device 221 cancels the countermeasure function which is in operation, returns the communication path to a normal state before the countermeasure function was activated, and ends the process using the filter device 222 (Step S50).

With the above-described procedure, the communication system 1 can reduce the aggressive communication traffic. Note that, although the above-described procedure includes a procedure of switching a process in a normal condition and a process in a countermeasure condition, realizing a countermeasure is not restricted at all times.

Figure 3:
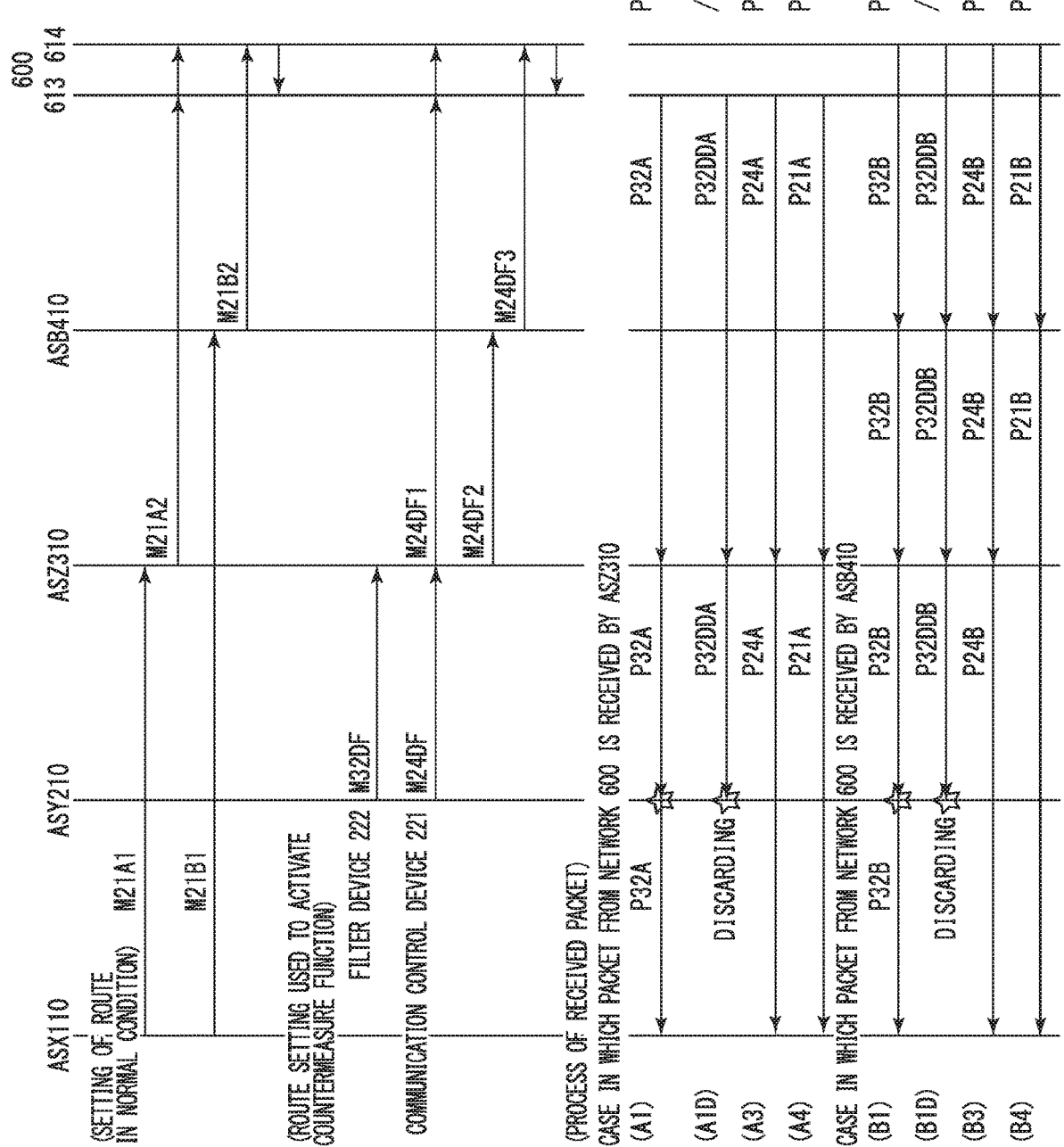
FIG. 3 is a sequence diagram describing an action of a countermeasure function using the communication system according to the embodiment.

Next, a countermeasure function using the communication system according to the embodiment will be described with reference to FIG. 3. FIG. 3 is a sequence diagram describing an action of the countermeasure function using the communication system according to the embodiment. FIG. 3 illustrates a required main procedure explaining functions of the embodiment.

Setting of Communication Path in Normal Condition

First, a communication path in a normal condition is set. The ASX 110 advertises routing information M21A1 on the ASZ 310. For example, the routing information M21A1 includes data obtained by designating "10.0.0.0/21," and "X" and "GX2" as prefixes for an AS path (AS-PATH) and a next hop (Next-hop), respectively. The ASZ 310 shares routing information in the ASZ 310 in response to the reception of the routing information M21A1 and advertises of the routing information M21A2 on the network 600. For example, the routing information M21A2 includes data obtained by designating "10.0.0.0/21," and "ZX" and "GZ1" as prefixes for an AS path and a next hop, respectively. Note that "X," "Y," "Z," and "B" designating AS paths indicate the ASX 110, the ASY 210, the ASZ 310, and the ASB 410, respectively. For example, it is assumed that AS paths described as "ZX" as described above are listed in the order of "X" and "Z." The same applies to the following description.

A multi-home ASX 110 advertises the ASB 410 of the routing information M21B1. For example, the routing information M21B1 includes data obtained by designating "10.0.0.0/21," and "X" and "GX3" as prefixes for an AS path and a next hop, respectively. The ASB 410 shares routing information in the ASB 410 in response to the reception of the routing information M21B1 and advertises the routing information M21B2 on the network 600. For example, the routing information M21B2 includes data obtained by designating "10.0.0.0/21," and "BX" and "GB1" as prefixes for an AS path and a next hop, respectively.

The routers constituting the network 600 acquire the routing information M21A2 and the routing information M21B2 and update held routing information.

Path Setting Used to Activate Countermeasure Function

The communication control device 221 controls the router 211 or the filter device 222 to generate the routing information M32DF. The routing information M32DF includes data obtained by designating "10.0.0.1/32," and "YX" and "GY1" indicating a gateway of the ASY 210 as prefixes for an AS path and a next hop, respectively. In addition, the communication control device 221 generates the routing information M24DF. For example, the routing information M24DF includes data obtained by designating "10.0.0.0/24," and "YX" and "GX2" indicating a gateway of the ASX 110 as prefixes for an AS path and a next hop, respectively. A path for countermeasures is set without advertising on an AS path from the ASX 110 side by attaching "X" to the beginning of the AS path when the AS path is designated.

The communication control device 221 causes the router 211 to advertise the routing information M32DF and the routing information M24DF on the ASZ 310.

Note that the routing information M32DF includes address information indicating a predetermined address space having a prefix designated as, for example, "10.0.0.1/32," and the predetermined address space is set to be narrower than an address space of the network 101 (or the network 100; a first network). The routing information M24DF includes address information indicating the address space of the network 101 (or the network 100; the first network). The routing information M24DF may further include information used to allow the routing information M32DF (second routing information) to be preferentially selected over the first routing information.

The ASZ 310 shares routing information in the ASZ 310 in response to the reception of the routing information M32DF and the routing information M24DF, advertises the routing information M24DF1 on the network 600, and advertises the routing information M24DF2 on the ASB 410. For example, the routing information M24DF1 includes data obtained by designating "10.0.0.0/24," and "ZYX" and "GZ1" as prefixes for an AS path and a next hop, respectively. The routing information M24DF2 includes data obtained by designating "10.0.0.0/24," and "ZYX" and "GZ2" as prefixes for an AS path and a next hop, respectively.

The ASB 410 shares routing information in the ASB 410 in response to the reception of the routing information M24DF2 and advertises the routing information M24DF3 on the network 600. For example, the routing information M24DF3 includes data obtained by designating "10.0.0.0/24," and "BZYX" and "GB1" as prefixes for an AS path and a next hop, respectively.

The routers constituting the network 600 acquire the routing information M24DF1 and the routing information M24DF3 and update held routing information.

Forwarding of Packet Received from Network 600

Figure 4:
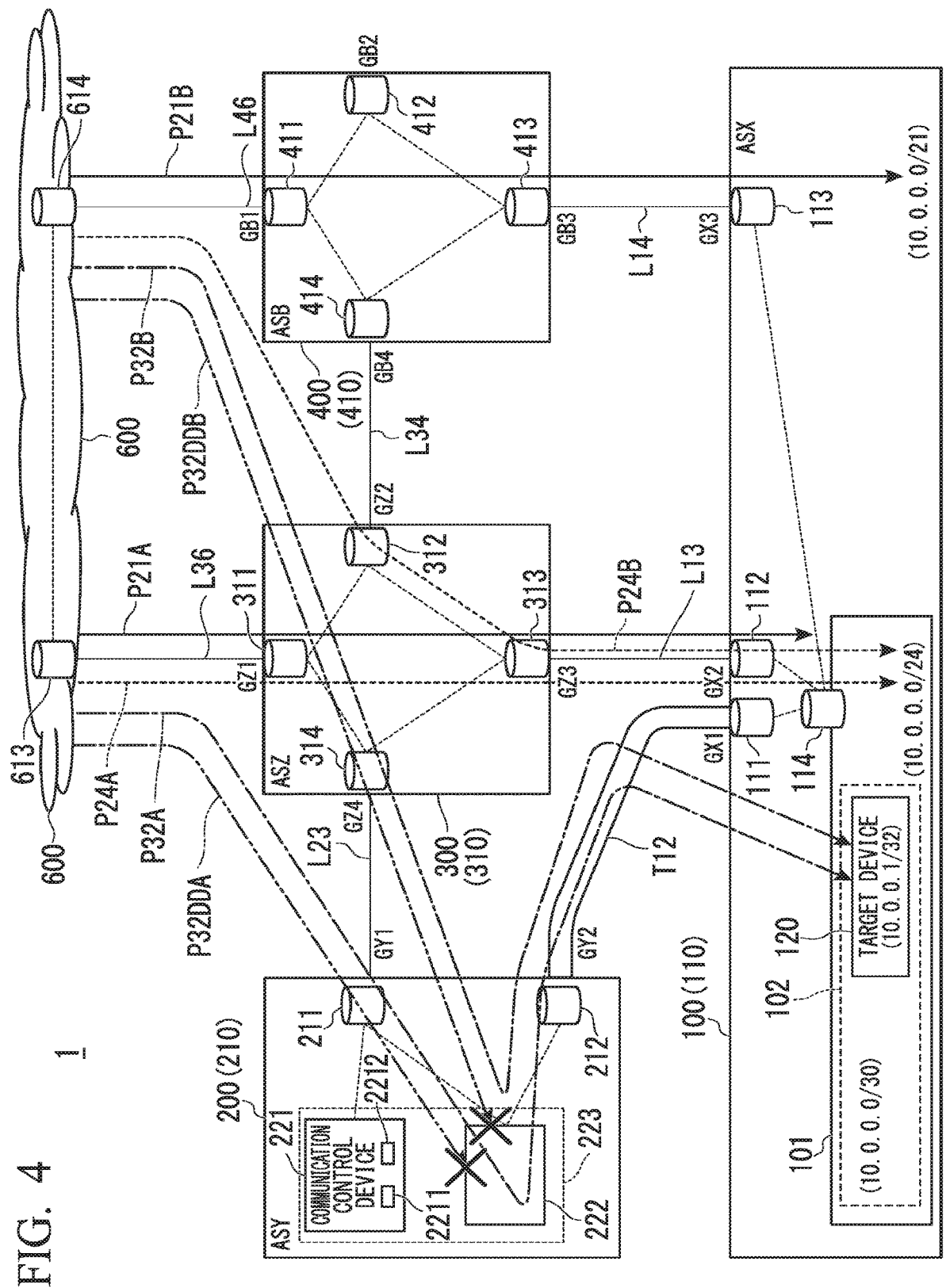
FIG. 4 is a diagram describing a communication path when the countermeasure function using the communication system according to the embodiment is in operation.

FIG. 4 is a diagram describing a communication path when the countermeasure function using the communication system according to the embodiment is in operation. A description will be provided with reference to FIGS. 3 and 4.

The ASZ 310 performs a forwarding process as will be illustrated below in accordance with a transmission destination address of a packet from the router 613 of the network 600 when receiving the packet.

Case A1: Regarding a case in which the ASZ 310 receives a packet which is not aggressive communication addressed to the target device 120

The ASZ 310 forwards a packet P32A having a transmission destination IP address of "10.0.0.1/32" serving as a packet addressed to the target device 120 to the ASY 210 when receiving the packet P32A. The ASY 210 acquires the packet P32A and determines whether the acquired packet P32A is an aggressive communication packet in the filter device 222. As a result of the determination, when it is determined that the acquired packet P32A is not an aggressive communication packet, the filter device 222 forwards the packet P32A to the ASX 110 via the tunnel T12. The ASX 110 acquires the forwarded packet P32A and the target device 120 receives the packet P32A.

Case A1D: regarding a case in which the ASZ 310 receives an aggressive communication packet addressed to the target device 120

The ASZ 310 forwards a packet P32DDA having a transmission destination IP address of "10.0.0.1/32" serving as a packet addressed to the target device 120 to the ASY 210 as in the case of Case A1 when receiving the packet P32DDA. The ASY 210 acquires the packet P32DDA and determines whether the acquired packet P32DDA is an aggressive communication packet in the filter device 222. As a result of the determination, when it is determined that the acquired packet P32DDA is an aggressive packet, the filter device 222 discards the packet P32DDA.

Case A3: regarding a case in which the ASZ 310 receives a packet obtained by designating a transmission destination IP address included in "10.0.0.0/24" other than a packet addressed to the target device 120

The ASZ 310 forwards a packet P24A obtained by designating the transmission destination IP address included in "10.0.0.0/24" other than the packet addressed to the target device 120 to the ASX 110 when receiving the packet P24A. The ASX 110 acquires the forwarded packet P24A.

Case A4: regarding a case in which the ASZ 310 receives a packet obtained by designating a transmission destination IP address included in "10.0.0.0/21" other than "10.0.0.0/24"

The ASZ 310 forwards a packet P21A obtained by designating a transmission destination IP address included in "10.0.0.0/21" other than "10.0.0.0/24" to the ASX 110 when receiving the packet P21A. The ASX 110 acquires the forwarded packet P21A.

Also, the ASB 410 performs a forwarding process as will be illustrated below in accordance with a transmission destination address of a packet from the router 614 of the network 600 when receiving the packet.

Case B1: regarding a case in which the ASB 410 receives a packet which is not aggressive communication addressed to the target device 120

The ASB 410 forwards a packet P32B having a transmission destination IP address of "10.0.0.1/32" serving as a packet addressed to the target device 120 to the ASZ 310 when receiving the packet P32B. The ASZ 310 forwards the received packet P32B to the ASY 210. The ASY 210 acquires the packet P32B and determines whether the acquired packet P32B is an aggressive communication packet in the filter device 222. As a result of the determination, when it is determined that the acquired packet P32B is not an aggressive communication packet, the ASY 210 forwards the packet P32B to the ASX 110 via the tunnel T12. The ASX 110 acquires the forwarded packet P32B and the target device 120 receives the packet P32B.

Case B1D: regarding a case in which the ASB 410 receives an aggressive communication packet addressed to the target device 120

The ASB 410 forwards a packet P32DDB having a transmission destination IP address of "10.0.0.1/32" serving as a packet addressed to the target device 120 to the ASZ 310 when receiving the packet P32DDB. The ASZ 310 forwards the received packet P32DDB to the ASY 210. As in the case of Case A1D, the ASY 210 acquires the packet P32DDB and determines whether the acquired packet P32DDB is an aggressive communication packet in the filter device 222. As a result of the determination, when it is determined that the acquired packet P32DDB is an aggressive packet, the filter device 222 discards the packet P32DDB.

Case B3: regarding a case in which the ASB 410 receives a packet obtained by designating a transmission destination IP address included in "10.0.0.0/24" other than a packet addressed to the target device 120

The ASB 410 forwards a packet P24B obtained by designating the transmission destination IP address included in "10.0.0.0/24" other than the packet addressed to the target device 120 to the ASZ 310 when receiving the packet P24B. The ASZ 310 forwards the received packet P24B to the ASX 110. The ASX 110 acquires the forwarded packet P24B.

Case B4: regarding a case in which the ASB 410 receives a packet obtained by designating a transmission destination IP address included in "10.0.0.0/21" other than "10.0.0.0/24"

The ASB 410 forwards a packet P21B obtained by designating the transmission destination IP address included in "10.0.0.0/21" other than "10.0.0.0/24" to the ASX 110 when receiving the packet P21B. The ASX 110 acquires the forwarded packet P21B.

As described above, the communication system according to the embodiment advertises routes using the BGP on the following two paths.

A route of "/32" (an IP address of the target device 120) used to designate a next hop as an IP address of the filter device 222 or the ASY 210

A route of "/24 (an IP address space which includes the target device 120 and in which a prefix is designated as "/24" or more)" in which the ASX 110 is added to an AS path and a next hop is designated as an IP address of the router 112 of the ASX 110

Route control used to designate a communication path is possible by providing the above-described two routes as illustrated with reference to FIG. 4. As described above, the communication system 1 need not change the setting of a router in the ASX 110 and thus a DDoS countermeasure service with a low delay can be provided. Thus, the communication system 1 improves convenience of the communication system.

Second Embodiment

Figure 5:
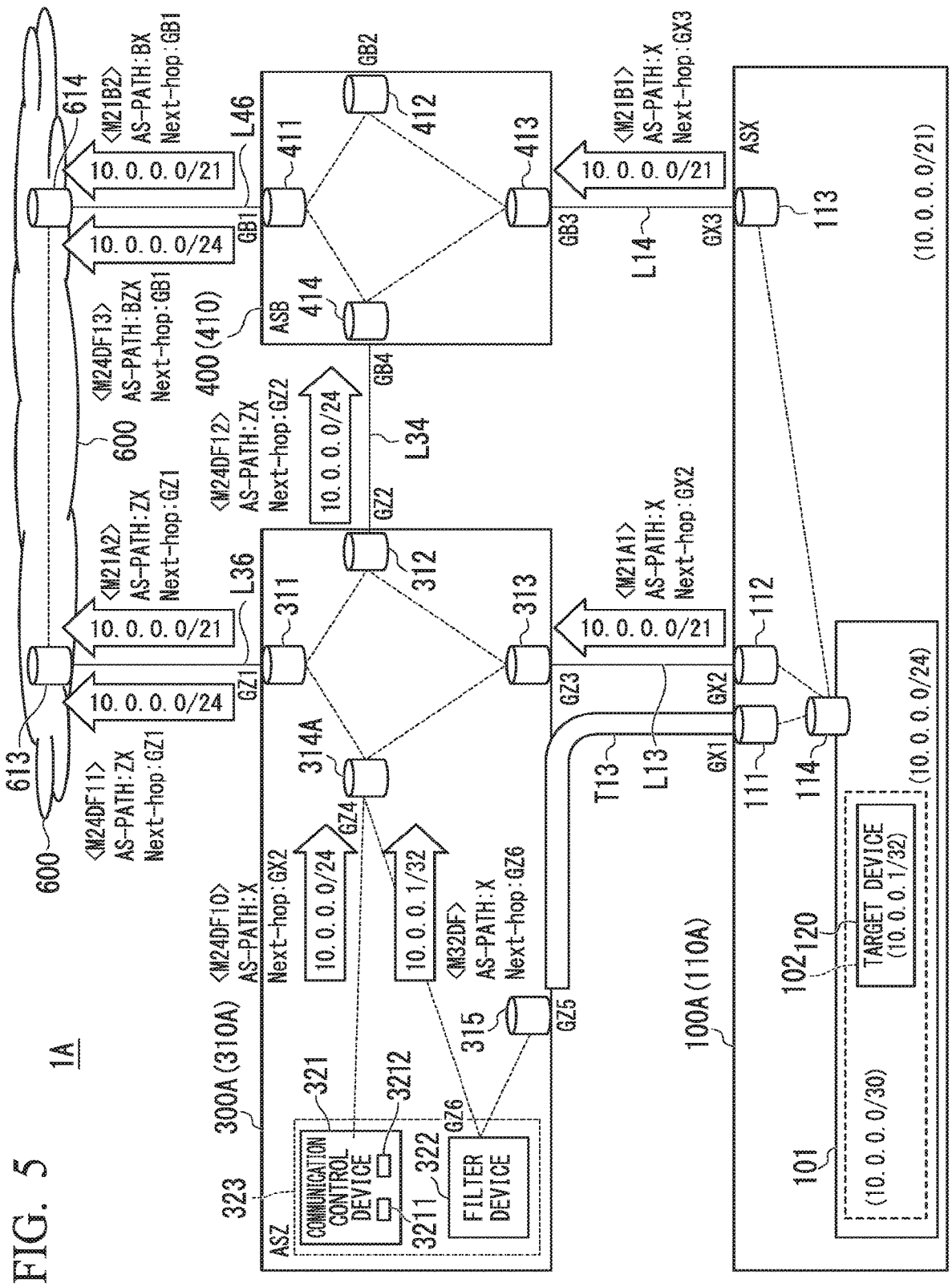
FIG. 5 is a constitution diagram of a communication system according to a second embodiment.

Next, a communication system 1A according to this embodiment will be described with reference to FIGS. 2 and 5 to 7. FIG. 5 is a constitution diagram of the communication system according to the embodiment. The communication system 1A according to the embodiment suppresses aggressive communication traffic in an ASZ 310A. The same constituent elements as those of the first embodiment are denoted with the same reference numerals and differences will be mainly described.

The communication system 1A shown in FIG. 5 includes an ASX 110A, the ASZ 310A, an ASB 410, and a network 600. The ASX 110A, the ASZ 310A, and the ASB 410 are ASs. The ASX 110A, the ASZ 310A, and the ASB 410 are associated with a network 100A, a network 300A, and a network 400.

The ASX 110A includes a router 111, a router 112, a router 113, a router 114, and a target device 120. The router 111 is connected to the ASZ 310A via a tunnel T13 forming a logical path in a port GX1.

The ASZ 310A connected to the ASX 110A via the logical path L13 and the tunnel T13 includes a router 311, a router 312, a router 313, a router 314A, a communication control device 321, and a filter device 322.

The router 311, the router 312, and the router 313 are connected to an external network and advertise routing information on each AS corresponding to a network of a connection destination.

The communication control device 321 and the filter device 322 are connected to the port GZ4 of the router 314A.

The routers, i.e., the router 311, the router 312, the router 313, and the router 314A, share routing information with each other and perform routing on communication in the ASZ 310A. Note that connection among the router 311, the router 312, the router 313, and the router 314A may have a constitution other than that illustrated in the drawings.

The communication control device 321 controls a communication path in the communication system 1A to perform control to reduce the influence of aggressive traffic. For example, the communication control device 321 includes a route-setting device 3211 and a communication control device 3212. The communication control device 321, the route-setting device 3211, and the communication control device 3212 correspond to the communication control device 221, the route-setting device 2211, and the communication control device 2212 (FIG. 1) described above.

The filter device 322 corresponds to the above-described filter device 222 (FIG. 1).

The communication system 1A constituted as described above reduces aggressive communication traffic in accordance with a procedure of a process illustrated in FIG. 2.

Figure 6:
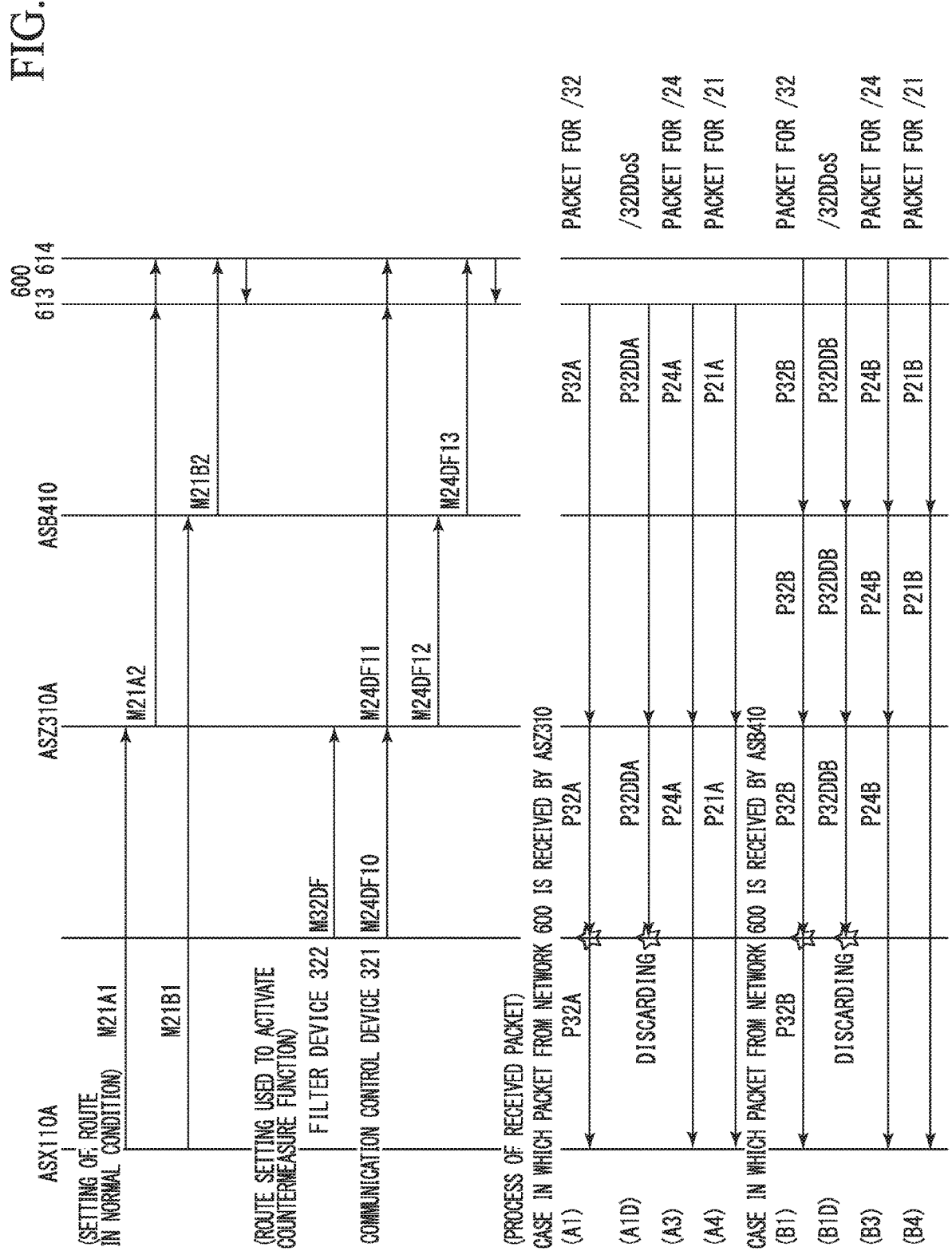
FIG. 6 is a sequence diagram describing an action of a countermeasure function using the communication system according to the embodiment.
Figure 7:
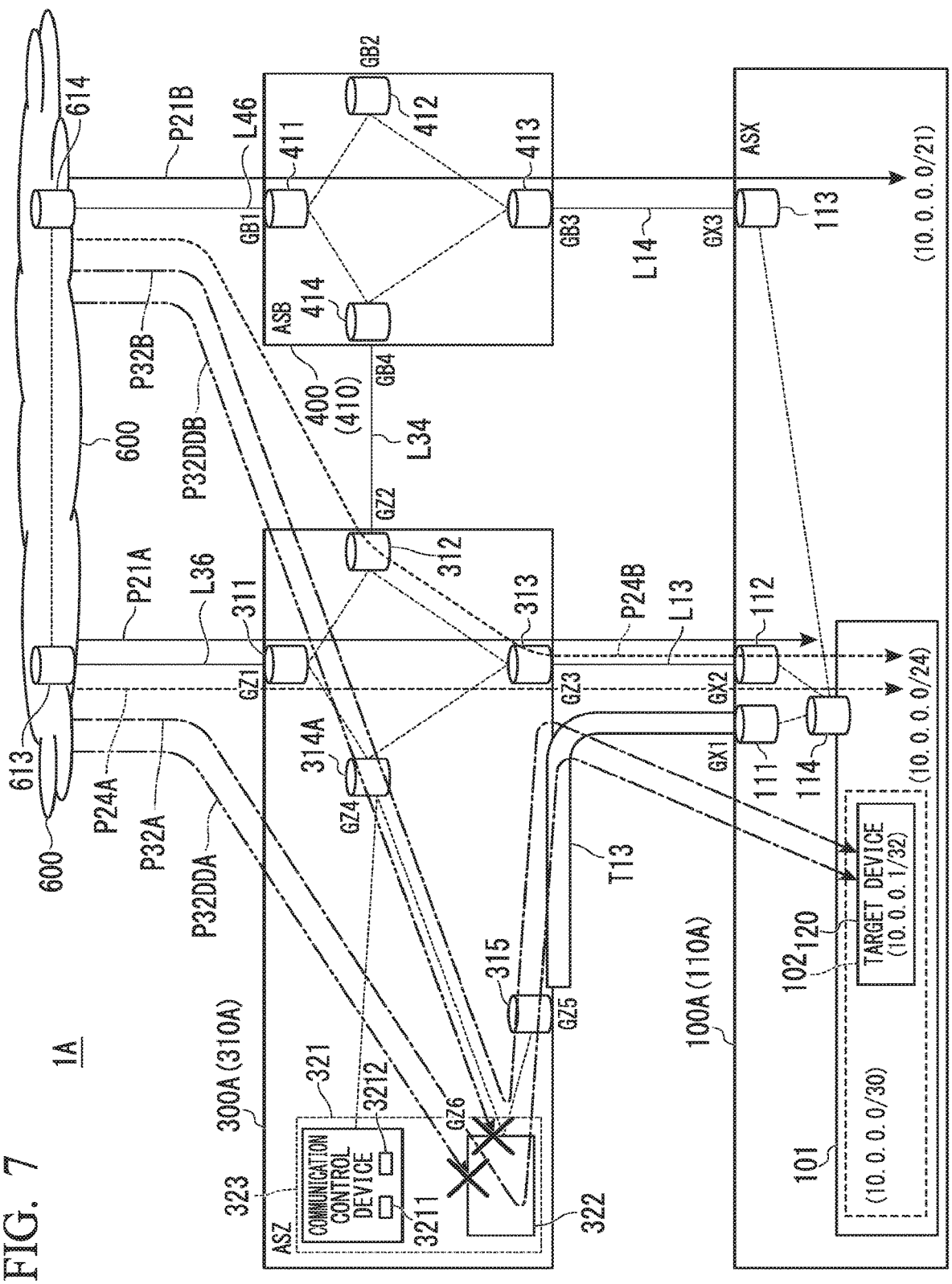
FIG. 7 is a diagram describing a communication path when the countermeasure function using the communication system according to the embodiment is in operation.

Next, a countermeasure function using the communication system according to the embodiment will be described with reference to FIGS. 6 and 7. FIG. 6 is a sequence diagram describing an action of the countermeasure function using the communication system according to the embodiment. FIG. 6 illustrates a required main procedure explaining the function of the embodiment. FIG. 7 is a diagram describing a communication path when the countermeasure function using the communication system according to the embodiment is in operation.

Setting of Communication Path in Normal Condition

First, a communication path in a normal condition is set. The ASX 110A advertises routing information M21A1 on the ASZ 310A. For example, the routing information M21A1 includes data obtained by designating "10.0.0.0/21," and "X" and "GX2" as prefixes for an AS path (AS-PATH) and a next hop (Next-hop), respectively. The ASZ 310A shares routing information in the ASZ 310A in response to the reception of the routing information M21A1 and advertises the routing information M21A2 on the network 600. For example, the routing information M21A2 includes data obtained by designating "10.0.0.0/21," and "ZX" and "GZ1" as prefixes for an AS path and a next hop, respectively. Note that "X," "Z," and "B" designating the AS paths indicate the ASX 110A, the ASZ 310A, and the ASB 410.

A multi-home ASX 110A advertises routing information M21B1 on the ASB 410. For example, the routing information M21B1 includes data obtained by designating "10.0.0.0/21," and "X" and "GX3" as prefixes for an AS path and a next hop, respectively. The ASB 410 shares routing information in the ASB 410 in response to the reception the routing information M21B1 and advertises routing information M21B2 on the network 600. For example, the routing information M21B2 includes data obtained by designating "10.0.0.0/21," and "BX" and "GB1" as prefixes for an AS path and a next hop, respectively.

Routers constituting the network 600 acquire the routing information M21A2 and the routing information M21B2 and update held routing information.

Path Setting Used to Activate Countermeasure Function

The communication control device 321 controls the filter device 322 to generate routing information M32DF and notifies the router 314A of the generated routing information M32DF in the same manner as the advertisement of routing information. The routing information M32DF includes data obtained by designating "10.0.0.1/32," and "X" and "GZ6" as prefixes for an AS path and a next hop, respectively. The ASZ 310A shares routing information in the ASZ 310A in response to the reception of the routing information M32DF.

In addition, the communication control device 321 generates routing information M24DF10 and notifies the router 314A of the generated routing information M24DF10 in the same manner as the advertisement of routing information. For example, the routing information M24DF10 includes data obtained by designating "10.0.0.0/24," and "X" and "GX2" as prefixes for an AS path and a next hop, respectively. The ASZ 310A shares routing information in the ASZ 310A in response to the reception of the routing information M24DF10, advertises routing information M24DF11 on the network 600, and advertises routing information M24DF12 on the ASB 410. For example, the routing information M24DF11 includes data obtained by designating "10.0.0.0/24," and "ZX" and "GZ1" as prefixes for an AS path and a next hop, respectively. The routing information M24DF12 includes data obtained by designating "10.0.0.0/24," and "ZX" and "GZ2" as prefixes for an AS path and a next hop, respectively.

The ASB 410 shares routing information in the ASB 410 in response to the reception of the routing information M24DF12 and advertises routing information M24DF13 on the network 600. For example, the routing information M24DF13 includes data obtained by designating "10.0.0.0/24," and "BZX" and "GB1" as prefixes for an AS path and a next hop, respectively.

The routers constituting the network 600 acquire the routing information M24DF11 and the routing information M24DF13 and update held routing information.

Forwarding of Packet Received from Network 600

The ASZ 310A performs a forwarding process in accordance with a transmission destination address of a packet from the network 600 as in the above-described first embodiment when receiving the packet and discards an aggressive communication packet in the filter device 322.

As described above, the communication system 1A according to the embodiment can improve convenience of the communication system by accommodating the filter device 322 (a filter device) in the network 300A (a second network) and controlling the communication control device 321 (a communication control device) so that communication leading to the target device 120 (a specific device) via the first path leads to the filter device 322 provided in the network 300A.

Third Embodiment

Figure 8:
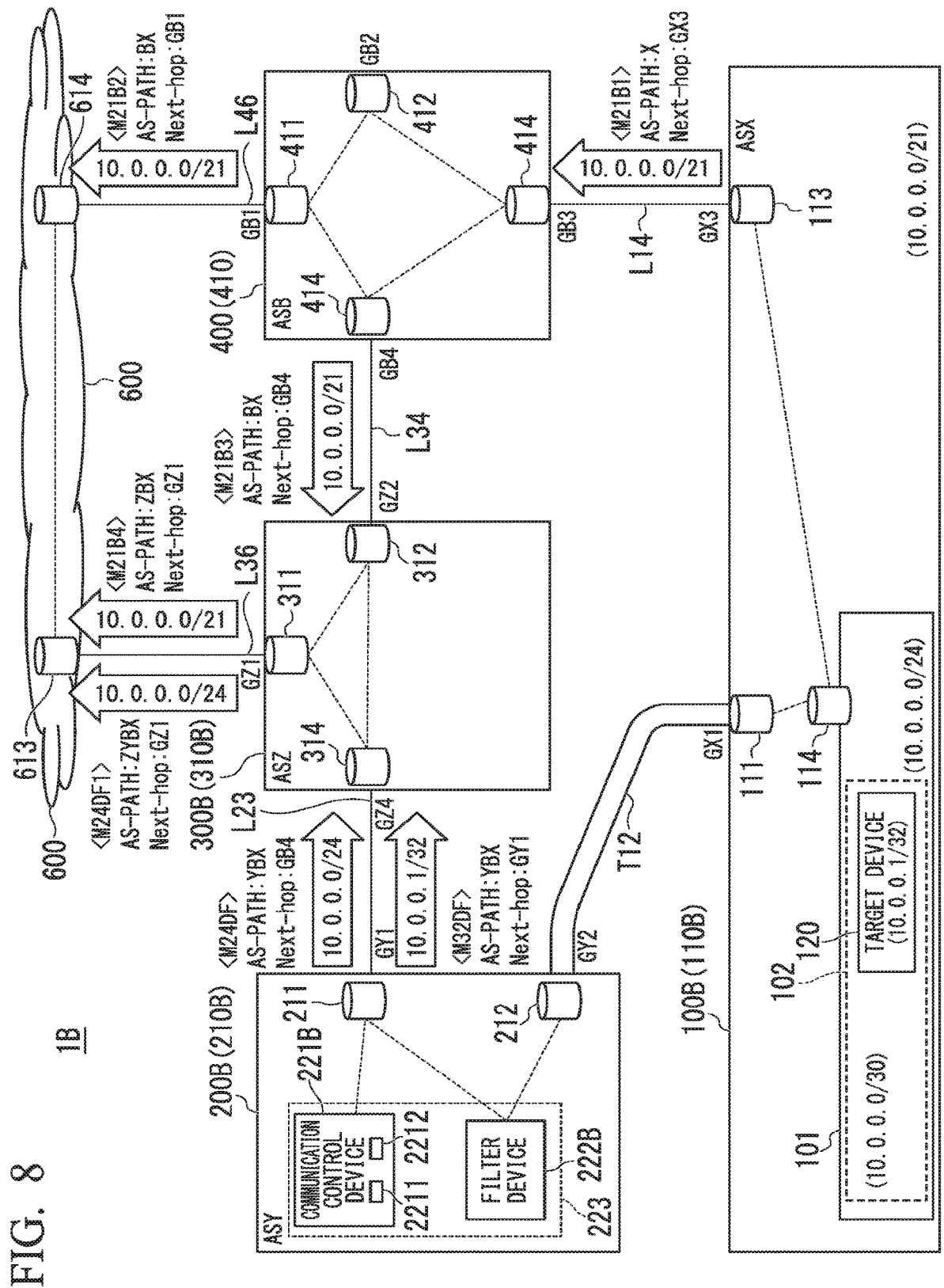
FIG. 8 is a constitution diagram of a communication system according to a third embodiment.

Next, a communication system 1B according to this embodiment will be described with reference to FIGS. 2 and 8 to 10. FIG. 8 is a constitution diagram of the communication system according to the embodiment.

The communication system 1B according to the embodiment includes an ASX 110B connected to an ASZ 310B via another AS and does not include a directly connected communication path between the ASX 110B and the ASZ 310B. The same constituent elements as those of the first embodiment will be denoted with the same reference numerals and differences will be mainly described.

The communication system 1B illustrated in FIG. 8 includes the ASX 110B, an ASY 210B, the ASZ 310B, an ASB 410, and a network 600. The ASX 110B, the ASY 210B, the ASZ 310B, and the ASB 410 are ASs.

The ASX 110B, the ASY 210B, the ASZ 310B, and the ASB 410 are associated with a network 100B, a network 200B, a network 300B, and a network 400.

The ASX 110B includes a router 111, a router 113, a router 114, and a target device 120. The routers, i.e., the router 111, the router 113, and the router 114, share routing information with each other and perform routing on communication in the ASX 110B. Note that connection among the router 111, the router 113, and the router 114 may have a constitution other than that illustrated in the drawings. The router 111 and the router 113 are connected to an external network and the router 113 advertises routing information corresponding to a network of a connection destination on the ASB 410.

The ASZ 310B which is not directly connected to the ASX 110B includes the router 311, the router 312, and the router 314.

The router 311, the router 312, and the router 314 are connected to an external network and advertise routing information on each AS corresponding to a network of a connection destination.

The routers, i.e., the router 311, the router 312, and the router 314, share routing information with each other and perform routing on communication in the ASZ 310B. Note that connection among the router 311, the router 312, and the router 314 may have a constitution other than that illustrated in the drawings.

The ASB 410 connected to the ASX 110B via the logical path L14 includes a router 411, a router 412, a router 413, and a router 414.

The ASY 210B includes a router 211, a router 212, a communication control device 221B, and a filter device 222B.

The communication system 1B constituted as described above reduces aggressive communication traffic in accordance with a procedure of a process illustrated in FIG. 2.

Figure 9:
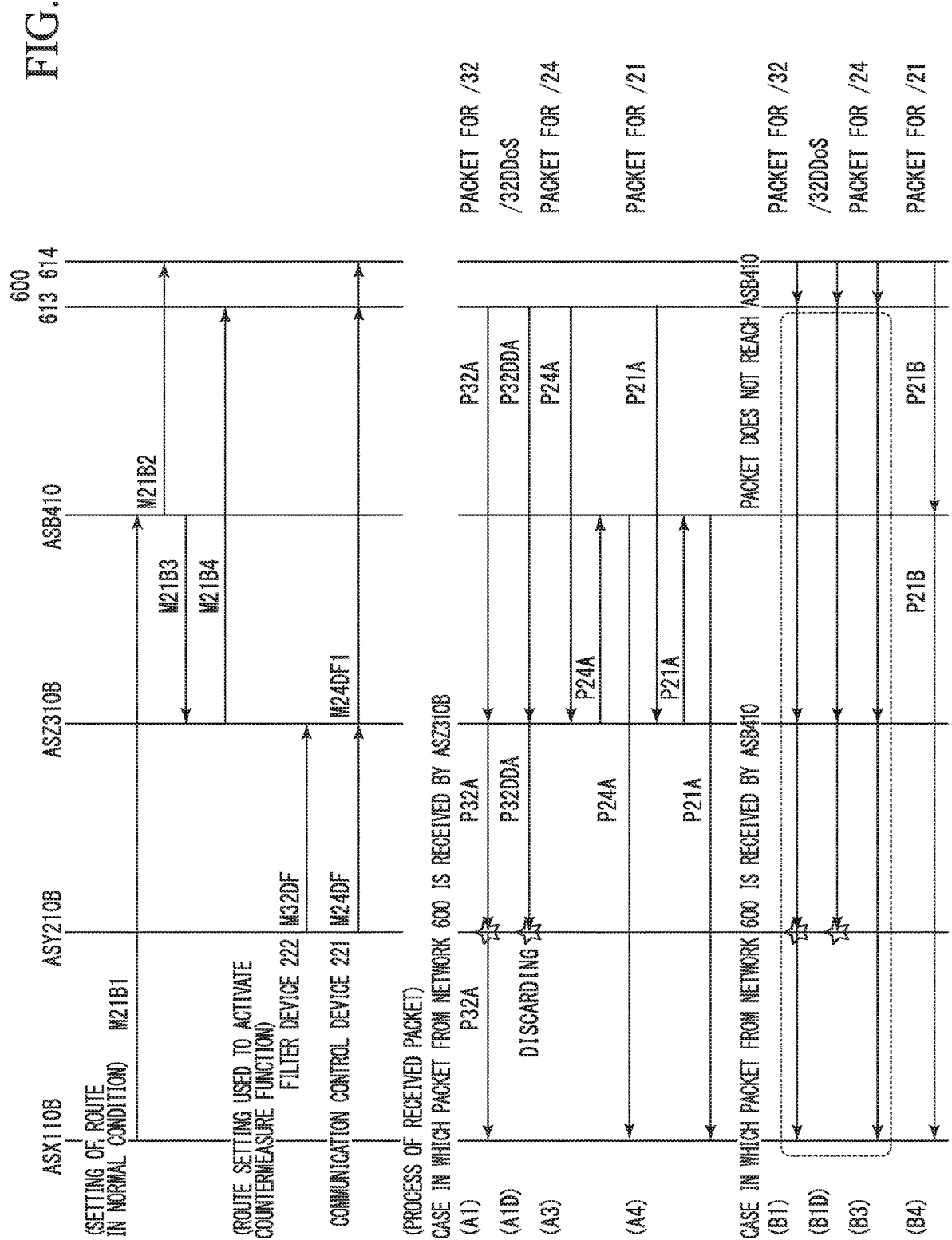
FIG. 9 is a sequence diagram describing an action of a countermeasure function using the communication system according to the embodiment.
Figure 10:
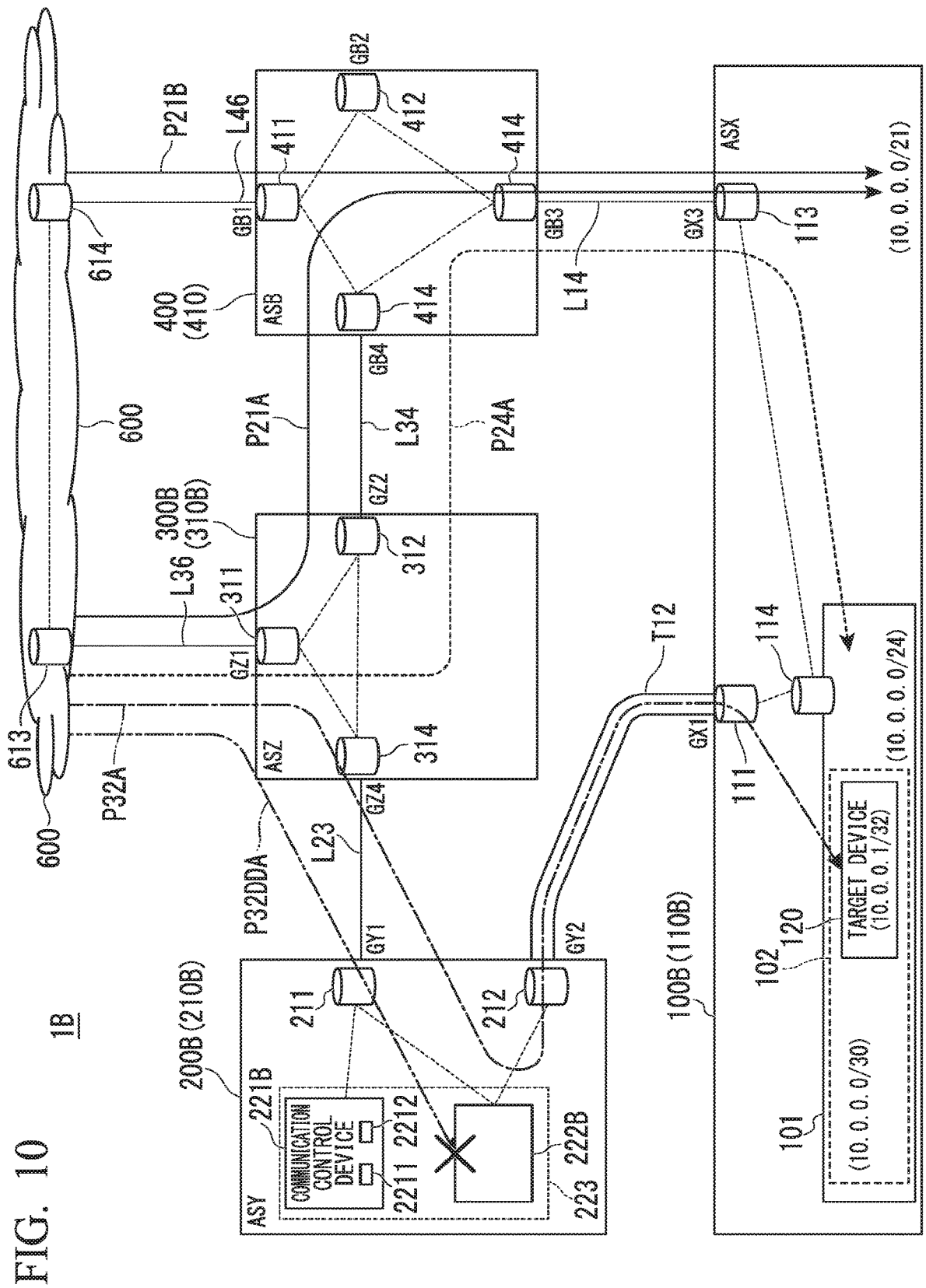
FIG. 10 is a diagram describing a communication path when the countermeasure function using the communication system according to the embodiment is in operation.

FIG. 9 is a sequence diagram describing an action of a countermeasure function using the communication system according to the embodiment. FIG. 9 illustrates a required main procedure explaining the function of the embodiment. FIG. 10 is a diagram describing a communication path when the countermeasure function using the communication system according to the embodiment is in operation.

Setting of Communication Path in Normal Condition

First, a communication path in a normal condition is set. The ASX 110B advertises routing information M21B1 on the ASB 410. For example, the routing information M21B1 includes data obtained by designating "10.0.0.0/21," and "X" and "GX3" as prefixes for an AS path and a next hop, respectively.

The ASB 410 shares routing information in the ASB 410 in response to the reception of the routing information M21B1, advertises routing information M21B2 on the network 600, and advertises routing information M21B3 on an AXZ 310B. For example, the routing information M21B2 includes data obtained by designating "10.0.0.0/21," and "BX" and "GB1" as prefix for an AS path and a next hop, respectively. The routing information M21B3 includes data obtained by designating "10.0.0.0/21," and "BX" and "GB4" as prefixes for an AS path and a next hop, respectively.

The ASZ 310B shares routing information in the ASZ 310B in response to the reception of the routing information M21B3 and advertises routing information M21B4 on the network 600. For example, the routing information M21B4 includes data obtained by designating "10.0.0.0/21," and "ZBX" and "GZ1" as prefixes for an AS path and a next hop, respectively.

Routers constituting the network 600 acquire the routing information M21B2 and the routing information M21B4 and update held routing information.

Path Setting Used to Activate Countermeasure Function

The communication control device 221B controls the router 211 or the filter device 222B to generate routing information M32DF. The routing information M32DF includes data obtained by designating "10.0.0.1/32," and "YBX" and "GY1" indicating a gateway of the ASY 210B as prefixes for an AS path and a next hop, respectively. In addition, the communication control device 221B generates routing information M24DF. For example, the routing information M24DF includes data obtained by designating "10.0.0.0/24," and "YBX" and "GB4" indicating a gateway of the ASB 410 as prefixes for an AS path and a next hop, respectively. When the AS path is designated, "X" and "B" are attached to the beginning of the AS path. Thus, a path for countermeasures is set without advertising on the AS path from the ASX 110B side.

The communication control device 221B causes the router 211 to advertise the routing information M32DF and the routing information M24DF on the ASZ 310B.

The ASZ 310B shares routing information in the ASZ 310B in response to the reception of the routing information M24DF and advertises routing information M24DF1 on the network 600. For example, the routing information M24DF1 includes data obtained by designating "10.0.0.0/24," and "ZYBX" and "GZ1" as prefixes for an AS path and a next hop, respectively.

The routers constituting the network 600 acquire the routing information M24DF1 and update held routing information.

Forwarding of Packet Received from Network 600

The ASZ 310B performs a forwarding process as will be described below in accordance with a transmission destination address of a packet when receiving the packet from a router 613 of the network 600.

Case A1: regarding a case in which the ASZ 310B receives a packet which is not aggressive communication addressed to the target device 120

In Case A1, as in the above-described first embodiment, the ASZ 310B forwards a packet P32A to be received to the ASY 210B. The ASY 210B acquires the packet P32A and determines whether the acquired packet P32A is an aggressive communication packet in the filter device 222B. The filter device 222B determines that the acquired packet P32A is not an aggressive communication packet and forwards the packet P32A to the ASX 110B via the tunnel T12. The ASX 110B acquires the forwarded packet P32A and the target device 120 receives the packet P32A.

Case A1D: regarding a case in which the ASZ 310B receives an aggressive communication packet addressed to the target device 120

In Case A1D, as in the above-described first embodiment, the ASZ 310B forwards a packet P32DDA to be received to the ASY 210B. The ASY 210B acquires the packet P32DDA and determines whether the acquired packet P32DDA is an aggressive communication packet in the filter device 222B. The filter device 222B determines that the acquired packet P32DDA is an aggressive communication packet and discards the packet.

Case A3: regarding a case in which the ASZ 310B receives a packet obtained by designating a transmission destination IP address included in "10.0.0.0/24" other than a packet addressed to the target device 120

The ASZ 310B forwards a packet P24A obtained by designating the transmission destination IP address included in "10.0.0.0/24" other than the packet addressed to the target device 120 to the ASB 410 when receiving the packet P24A. The ASB 410 forwards the received packet P24A to the ASX 110B. The ASX 110B acquires the forwarded packet P24A.

Case A4: regarding a case in which the ASZ 310B receives a packet obtained by designating a transmission destination IP address included in "10.0.0.0/21" other than "10.0.0.0/24"

The ASZ 310B forwards a packet P21A obtained by designating the transmission destination IP address included in "10.0.0.0/21" other than "10.0.0.0/24" to the ASB 410 when receiving the packet P21A. The ASB 410 forwards the received packet P21A to the ASX 110B. The ASX 110B acquires the forwarded packet P21A.

The ASB 410 performs a forwarding process as will be described below in accordance with a transmission destination address of a packet when receiving the packet from the router 614 of the network 600.

However, in the case of the embodiment, packets received by the ASB 410 from the router 614 of the network 600 are restricted. For example, the packets for communication addressed to the target device 120 (Case B1 and Case B1D) and the packet obtained by designating the transmission destination IP address included in "10.0.0.0/24" than the packet addressed to the target device 120 (Case B3) are not included in packets to be received.

Case B4: regarding a case in which the ASB 410 receives a packet obtained by designating a transmission destination IP address included in "10.0.0.0/21" other than "10.0.0.0/24"

The ASB 410 forwards a packet P21B obtained by designating a transmission destination IP address included in "10.0.0.0/21" other than "10.0.0.0/24" to the ASX 110B when receiving the packet P21B. The ASX 110B acquires the forwarded packet P21B.

As described above, the communication system 1B according to the embodiment can improve convenience of the communication system.

Fourth Embodiment

Figure 11:
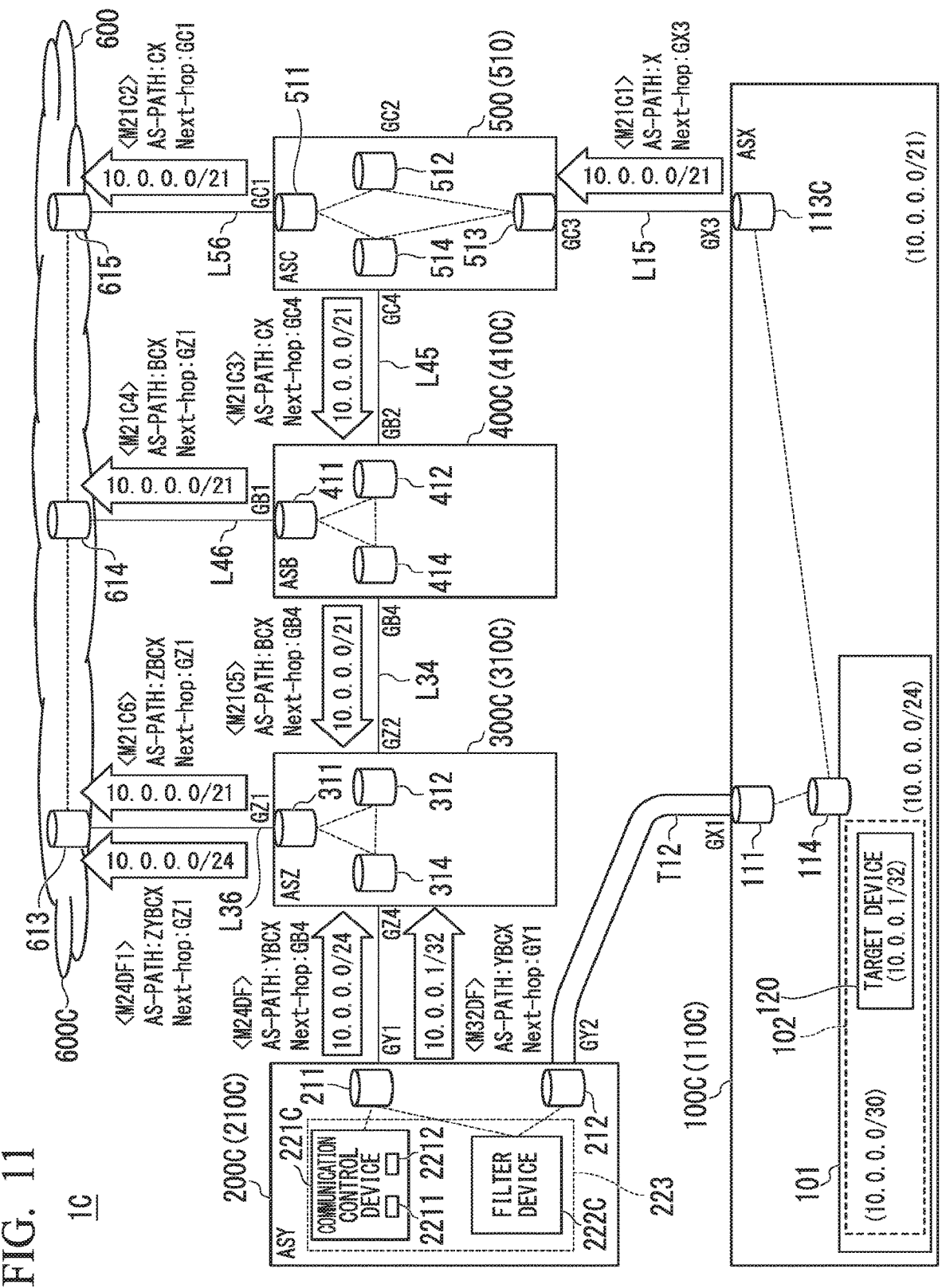
FIG. 11 is a constitution diagram of a communication system according to a fourth embodiment.

Next, a communication system 1C according to this embodiment will be described with reference to FIGS. 2 and 11 to 13. FIG. 11 is a constitution diagram of the communication system according to the embodiment. The communication system 1C according to the embodiment suppresses aggressive communication traffic in the ASY 210C. The same constituent elements as those of the first embodiment will be denoted with the same reference numerals and differences will be mainly described.

The communication system 1C illustrated in FIG. 11 includes an ASX 110C, an ASY 210C, an ASZ 310C, an ASB 410C, and ASC 510, and a network 600C.

The ASX 110C, the ASY 210C, the ASZ 310C, the ASB 410C, and the ASC 510 are ASs. The ASX 110C, the ASY 210C, the ASZ 310C, the ASB 410C, and the ASC 510 are associated with a network 100C, a network 200C, a network 300C, a network 400C, and a network 500.

A network 600C is a specific network constituting the Internet and is constituted of one or more ASs. The network 600C includes, for example, a router 613, a router 614, and a router 615, and routing information is shared among the routers including the router 613, the router 614, and the router 615.

The ASX 110C includes a router 111, a router 113C, a router 114, and a target device 120.

The routers, i.e., the router 111, the router 113C, and the router 114, share routing information with each other and perform routing on communication in the ASX 1100. Note that connection among the router 111, the router 113C, and the router 114 may have a constitution other than that illustrated in the drawings.

The router 111 and the router 113C are connected to an external network and the router 113C advertises routing information corresponding to a network of a connection destination on the ASC 510.

The ASZ 310C which is not directly connected to the ASX 110C includes a router 311, a router 312, and a router 314.

The router 311, the router 312, and the router 314 are connected to an external network and advertise routing information on each AS corresponding to a network of a connection destination.

The routers, i.e., the router 311, the router 312, and the router 314, share routing information with each other and perform routing on communication in the ASZ 310C. Note that connection among the router 311, the router 312, and the router 314 may have a constitution other than that illustrated in the drawings.

The ASB 410C which is not directly connected to the ASX 110C includes a router 411, a router 412, and a router 414.

The router 411, the router 412, and the router 414 are connected to an external network and advertise each AS corresponding to a network of a connection destination of routing information. For example, the router 412 is connected to the ASC 510 via a logical path L45 in a port GB2.

The routers, i.e., the router 411, the router 412, and the router 414, share routing information with each other and perform routing on communication in the ASB 410C. Note that connection among the router 411, the router 412, and the router 414 may have a constitution other than that illustrated in the drawings.

The ASC 510 connected to the ASX 110C via a logical path L15 includes a router 511, a router 512, a router 513, and a router 514.

The router 511, the router 512, the router 513, and the router 514 are connected to an external network and advertise each AS corresponding to a network of a connection destination of routing information. For example, the router 513 is connected to the ASX 110C via the logical path L15 in a port GC3. The router 511 is connected to the router 615 of the network 600C via a logical path L56 in a port GC1. The router 514 is connected to the ASB 410C via the logical path L45 in a port GC4.

The routers, i.e., the router 511, the router 512, the router 513, and the router 514, share routing information with each other and perform routing on communication in the ASC 510. Note that connection among the router 511, the router 512, the router 513, and the router 514 may have a constitution other than that illustrated in the drawings.

The communication system 1C constituted as described above reduces aggressive communication traffic in accordance with a procedure of a process illustrated in FIG. 2.

Figure 12:
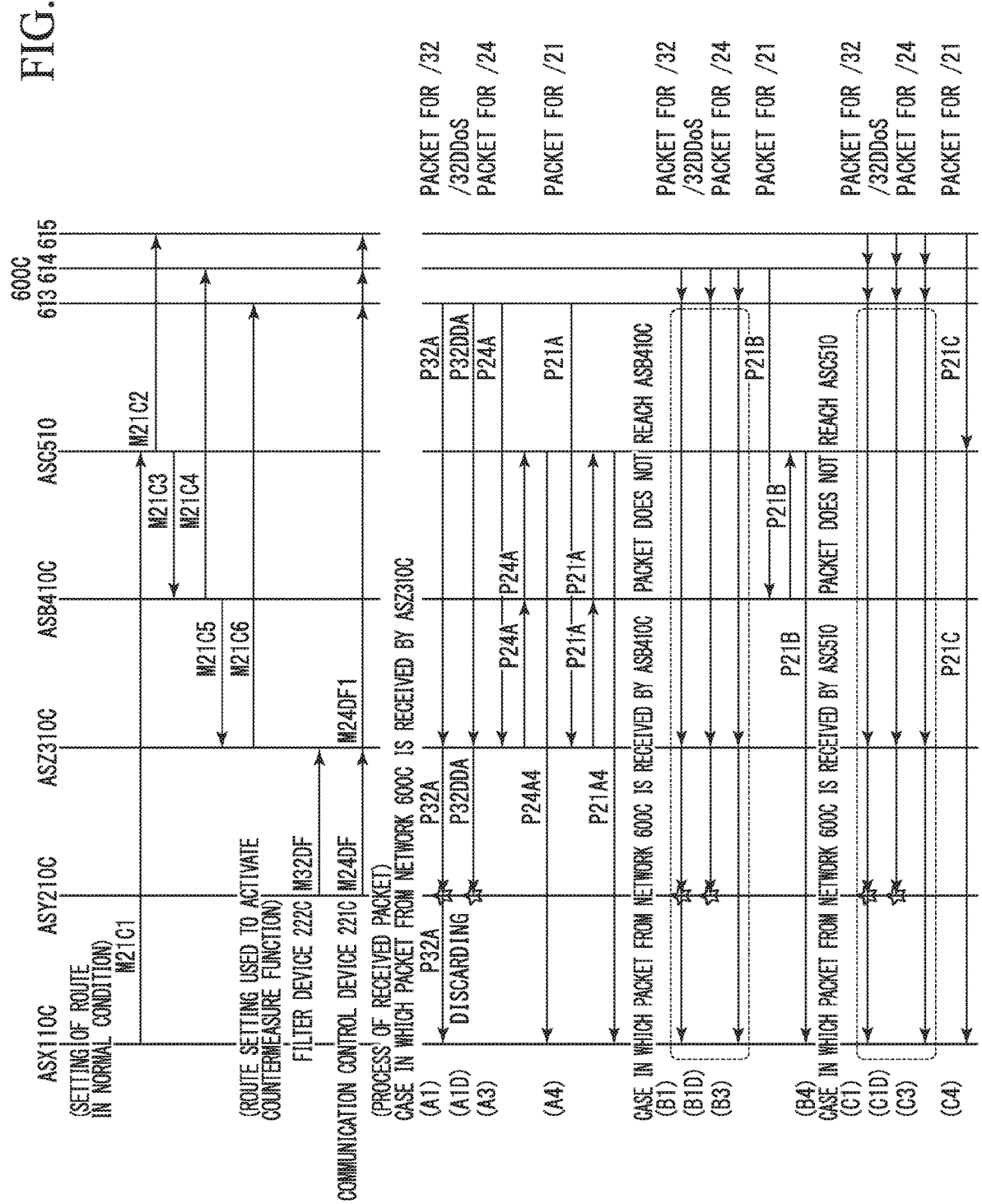
FIG. 12 is a sequence diagram describing an action of a countermeasure function using the communication system according to the embodiment.

Next, a countermeasure function using the communication system according to the embodiment will be described with reference to FIG. 12. FIG. 12 is a sequence diagram describing an action of the countermeasure function using the communication system according to the embodiment. FIG. 12 illustrates a required main procedure explaining the function of the embodiment.

Figure 13:
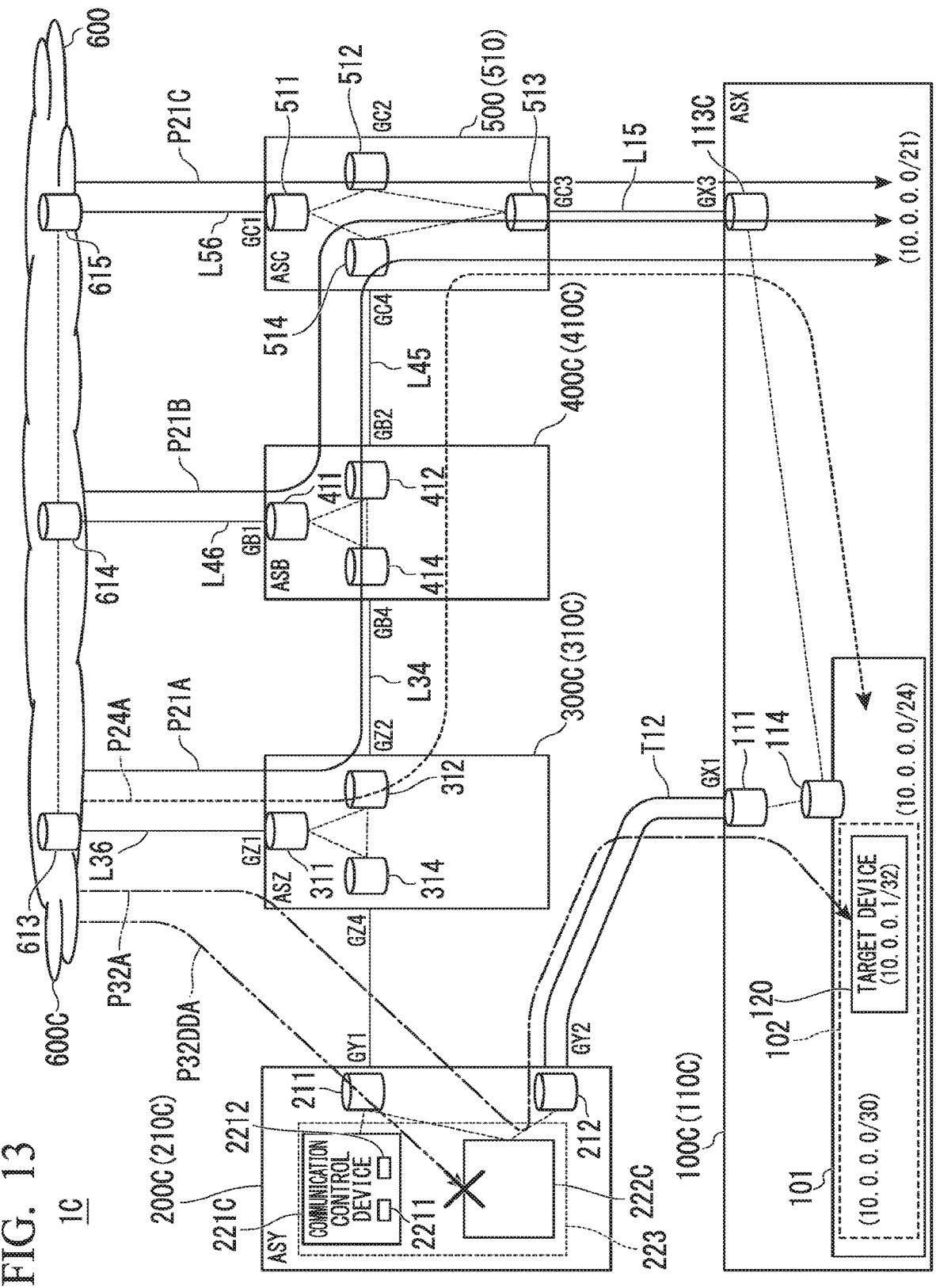
FIG. 13 is a diagram describing a communication path when the countermeasure function using the communication system according to the embodiment is in operation.

FIG. 13 is a diagram describing a communication path when the countermeasure function using the communication system according to the embodiment is in operation.

Setting of Communication Path in Normal Condition

First, a communication path in a normal condition is set. The ASX 110C advertises routing information M21C1 on the ASC 510. For example, the routing information M21C1 includes data obtained by designating "10.0.0.0/21," and "X" and "GX3" as prefixes for an AS path and a next hop, respectively.

The ASC 510 shares routing information in the ASC 510 in response to the reception of the routing information M21C1, advertises routing information M21C2 on the network 600C, and advertises routing information M21C3 on the ASB 410C. For example, the routing information M21C2 includes data obtained by designating "10.0.0.0/21," and "CX" and "GC1" as prefixes for an AS path and a next hop, respectively. The routing information M21C3 includes data obtained by designating "10.0.0.0/21," and "CX" and "GC4" as prefixes for an AS path and a next hop, respectively.

The ASB 410C shares routing information in the ASB 410C in response to the reception of the routing information M21C3, advertises routing information M21C4 on the network 600C, and advertises routing information M21C5 on the AXZ310C. For example, the routing information M21C4 includes data obtained by designating "10.0.0.0/21," and "BCX" and "GB1" as prefixes for an AS path and a next hop, respectively. The routing information M21C5 includes data obtained by designating "10.0.0.0/21," and "BCX" and "GB4" as prefixes for an AS path and a next hop, respectively.

The ASZ 310C shares routing information in the ASZ 310C in response to the reception of the routing information M21C5 and advertises routing information M21C6 on the network 600C. For example, the routing information M21C6 includes data obtained by designating "10.0.0.0/21" and "ZBCX" and "GZ1" as prefixes for an AS path and a next hop, respectively.

Routers constituting the network 600C acquire the routing information M21C2, the routing information M21C4, and the routing information M21C6 and update held routing information.

Path Setting Used to Activate Countermeasure Function

The communication control device 221C controls the router 211 or the filter device 222C to generate routing information M32DF. The routing information M32DF includes data obtained by designating "10.0.0.1/32," and "YBCX" and "GY1" as prefixes for an AS path and a next hop, respectively. In addition, the communication control device 221C generates routing information M24DF. For example, the routing information M24DF includes data obtained by designating "10.0.0.0/24," and "YBCX" and "GB4" as prefixes for an AS path and a next hop, respectively. When the AS path is designated, routing information received by the ASZ 310C from another AS which is routing information ("10.0.0.0/21") of a path in which the OriginAS is the ASX 110C, that is, the AS path ("BCX") in the routing information M2105, is reproduced and the reproduced routing information is attached to the beginning of the AS path designated above. The next hop of the routing information M24DF is caused to match the next hop ("GB4") included in the routing information M2105 as described above. In this manner, a path for countermeasures is set without advertising on an AS path from the ASX 110C side.

The communication control device 221C advertises the routing information M32DF and the routing information M24DF from the router 211 on the ASZ 310C.

The ASZ 310C shares routing information in the ASZ 310C in response to the reception of the routing information M24DF and advertises routing information M24DF1 on the network 600C. For example, the routing information M24DF1 includes data obtained by designating "10.0.0.0/24" and "ZYBCX" and "GZ1" as prefixes for an AS path and a next hop, respectively.

The routers constituting the network 600C acquire the routing information M24DF1 and update held routing information.

Forwarding of Packet Received from Network 600C

The ASZ 310C performs a forwarding process as will be described below in accordance with a transmission destination address of a packet when receiving the packet from the router 613 of the network 600C.

Case A1: regarding a case in which the ASZ 310C receives a packet which is not aggressive communication addressed to the target device 120

In Case A1, as in the above-described first embodiment, the ASZ 310C forwards a packet P32A to be received to the ASY 210C. The ASY 210C acquires the packet P32A and determines whether the acquired packet P32A is an aggressive communication packet in the filter device 222C. The filter device 222C determines that the acquired packet P32A is not an aggressive communication packet and forwards the packet P32A to the ASX 110C via the tunnel T12. The ASX 110C acquires the forwarded packet P32A and the target device 120 receives the packet P32A.

Case A1D: regarding a case in which the ASZ 310C receives an aggressive communication packet addressed to the target device 120

In Case A1D, as in the above-described first embodiment, the ASZ 310C forwards a packet P32DDA to be received to the ASY 210C. The ASY 210C acquires the packet P32DDA and determines whether the acquired packet P32DDA is an aggressive communication packet in the filter device 222C. The filter device 222C determines that the acquired packet P32DDA is an aggressive communication packet and discards the packet.

Case A3: regarding a case in which the ASZ 310C receives a packet obtained by designating a transmission destination IP address included in "10.0.0.0/24" other than a packet addressed to the target device 120

The ASZ 310C forwards a packet P24A obtained by designating the transmission destination IP address included in "10.0.0.0/24" other than the packet addressed to the target device 120 to the ASB 410C when receiving the packet P24A. The ASB 410C forwards the received packet P24A to the ASC 510. The ASC 510 acquires the forwarded packet P24A. The ASC 510 forwards the received packet P24A to the ASX 110C. The ASX 110C acquires the forwarded packet P24A.

Case A4: regarding a case in which the ASZ 310C receives a packet obtained by designating a transmission destination IP address included in "10.0.0.0/21" other than "10.0.0.0/24"

The ASZ 310C forwards a packet P21A obtained by designating the transmission destination IP address included in "10.0.0.0/21" other than "10.0.0.0/24" to the ASB 410C when receiving the packet P21A. The ASB 410C forwards the received packet P21A to the ASC 510. The ASC 510 acquires the forwarded packet P21A. The ASC 510 forwards the received packet P21A to the ASX 110C. The ASX 110C acquires the forwarded packet P21A.

The ASB 410C performs a forwarding process as will be described below in accordance with a transmission destination address of a packet when receiving the packet from the router 614 of the network 600C.

However, in the case of the embodiment, packets received by the ASB 410C from the router 614 of the network 600C are restricted. For example, the packets for communication addressed to the target device 120 (Case B1 and Case B1D) and the packet obtained by designating the transmission destination IP address included in "10.0.0.0/24" other than the packet addressed to the target device 120 (Case B3) are not included in packets to be received.

Case B4: regarding a case in which the ASB 410C receives a packet obtained by designating a transmission destination IP address included in "10.0.0.0/21" other than "10.0.0.0/24"

The ASB 410C forwards a packet P21B obtained by designating the transmission destination IP address included in "10.0.0.0/21" other than "10.0.0.0/24" to the ASC 510 when receiving the packet P21B. The ASC 510 acquires the forwarded packet P21B and forwards the acquired packet P21B to the ASX 110C. The ASX 110C acquires the forwarded packet P21B.

The ASC 510 performs a forwarding process as will be described below in accordance with a transmission destination address of a packet when receiving the packet from the router 615 of the network 600C.

However, in the case of the embodiment, packets received by the ASC 510 from the router 615 of the network 600C are restricted. For example, the packets for communication addressed to the target device 120 (Case C1 and Case C1D) and the packet obtained by designating the transmission destination IP address included in "10.0.0.0/24" other than the packet addressed to the target device 120 (Case C3) are not included in packets to be received.

Case C4: regarding a case in which the ASC 510 receives a packet obtained by designating a transmission destination IP address included in "10.0.0.0/21" other than "10.0.0.0/24"

The ASC 510 forwards a packet P21C obtained by designating the transmission destination IP address included in "10.0.0.0/21" other than "10.0.0.0/24" to the ASX 110C when receiving the packet P21C. The ASX 110C acquires the forwarded packet P21C.

As described above, the communication system 1C according to the embodiment can improve convenience of the communication system.

The communication control method of using the routing information in the communication systems described above is summarized as will be described below.

1. Constitution Common to Embodiments

A first AS (for example, an ASX 110): an AS configured to accommodate a specific target device 120

A second AS (for example, an ASY 210 or an ASZ 310A): an AS configured to accommodate a device (a filter device 222 or a filter device 322) serving as a forwarding destination with respect to communication leading from the Internet or the like (a network 600) to a target device 120

A third AS (for example, an ASZ 310): an AS connected to the first AS, the second AS, and the Internet Communication paths for the ASs, i.e., the first AS, the second AS, and the third AS are controlled by a common routing protocol. Furthermore, the ASs route packets in accordance to a communication path controlled by the routing protocol.

Note that the second AS and the third AS may be common ASs.

2. Characteristics of Routing Information

The following two types of routing information are advertised on the third AS. For example, the advertisement of advertising the two types of routing information on the third AS is performed from the second AS.

Alternatively, routing information is shared in the third AS using a method of advertising the routing information.

2.1 First Routing Information (for Example, M24DF)

(1) An address space set by such routing information includes an address for the target device 120 and a range thereof is set to be narrower than that of an address space which is already propagated on the Internet as an address space for the first AS. When each AS relays a packet, a determination method (a longest match) configured to prioritize routing information which has an address section to be matched and in which the number of hits is long can he used by setting in this manner. Note that, when routing information is advertised on the Internet, it is necessary to follow the usage of the Internet (for example, a minimum device of a prefix is set to be "124").

(2) A forwarding destination is designated so that a packet transmitted to the transmission source is forwarded to a gateway belonging to an AS different from a second AS. The forwarding destination (a next hop) is designated in this manner so that a target forwarding can be performed more efficiently.

Note that the "AS different from the second AS" described above is, for example, the first AS.

2.2 Second Routing Information (for example, M32DF)

(1) Such routing information includes an address for the target device 120 and is set to he preferentially selected as compared to the first routing information.

(2) A forwarding destination is designated using a next hop so that a packet transmitted to be addressed to a transmission source of second routing information is forwarded to a communication device (for example, a filter device 222) belonging to the second AS.

(3) After the second routing information is advertised on a third AS (or after the second routing information is shared in each router in the third AS), whether the second routing information is advertised on the second routing information via the third AS or the second routing information is selected in accordance with an AS of a connection destination of the third AS.

For example, an AS which does not need an advertisement is designated by an AS path as an AS which does not need the advertisement. On the other hand, in an AS in which a connection destination may not necessarily follow the usage of the Internet, the second routing information can be designated as an advertisement destination.

Note that the first routing information and the second routing information are transmitted from the second AS.

Also, when the first AS is not directly connected to the third AS (for example, in the third embodiment and the fourth embodiment), other ASs (the ASB 410, the ASC 510, and the like) located between the first AS and the third AS are added to the AS paths of the first routing information and the second routing information.

Note that the communication systems 1, 1A, 1B, and 1C are constituted as described above so that communication via the tunnel T12 or the tunnel T13 can be limited to communication addressed to the target device 120 and the influence on normal communication can be reduced.

Also, the communication systems 1, 1A, 1B, and 1C restrict the communication addressed to the target device 120 as described above and can be configured to suppress traffic for communication via the tunnel T12 or the tunnel T13 to a predetermined amount of communication, thereby reducing operation costs.

The communication systems 1, 1A, 1B, and 1C can activate necessary countermeasures without the user's operation and without changing the setting of the router 112 of the ASX 110 corresponding to the user side when reducing the influence of aggressive communication addressed to the target device 120 as described above. For this reason, the communication systems 1, 1A, 1B, and 1C do not need to remotely change the setting of the router 112 while a communication situation is deteriorating under aggressive communication.

The functions in the above-described embodiments may be realized by a computer. In this case, a program configured to realize such functions is recorded on a computer-readable recording medium, the program recorded on the recording medium is read into a computer system and executed so that the functions in the above-described embodiments may be realized. Note that the "computer system" mentioned herein may include an operating system (OS) and hardware such as peripheral devices. Furthermore, the "computer-readable recording medium" refers to a storage device such as a flexible disk, a magneto-optical disk, a read-only memory (ROM), a portable medium such as a compact disk (CD)-ROM, and a hard disk built in a computer system. In addition, the "computer-readable recording medium" may include a medium configured to hold the program dynamically for a short period of time like a communication line when the program is transmitted over a network such as the Internet and a communication circuit such as a telephone line and a medium configured to hold the program for a certain period of time like a volatile memory inside a computer system serving as a server and a client in that case. Furthermore, the program may be used to realize some of the above-described functions. In addition, the above-described functions may be realized using a combination with a program which is already recorded in a computer system.

Note that processing devices constituting the communication systems 1, 1A, 1B, and 1C may be realized by dedicated hardware.

While the embodiments of the present invention have been described above, the communication system of the prevent invention is not limited to the above-described illustrated examples, and it goes without saying that various modifications can be made without departing from the gist of the present invention.

For example, according to the above description, although the filter device 222 can process the communication addressed to the target device 120, the network 102 (FIG. 1 and the like) including an IP address of the target device 120 in an address space may be designated using the routing information M30DF (not shown) instead of the routing information M32DF (FIGS. 1 and 3, and the like). For example, routing information M30DF using an address space of the network 102 as "10.0.0.0/30" or the like. In this case, the address space of the network 102 corresponding to the routing information M30DF is included in the address space ("10.0.0.0/24") designated by a prefix of routing information M24DF. The routing information M30DF is set as described above so that the routing information M30DF includes address information indicating a predetermined address space. The predetermined address space is set to be narrower than the address space ("10.0.0.0/24" and an address space of a first network) designated by the prefix of the routing information M24DF. The routing information M30DF includes information used to allow the routing information M30DF (second routing information) to be preferentially selected as compared to the routing information M24DF (first routing information). Examples of information used to allow routing information to be preferentially selected include information of a prefix and an address which indicates the number of bits of a network section, information for a longest match using information or the like on a netmask, information used to perform identification using a protocol, and the like.

Note that a path for a branch destination may be selected using a protocol. For example, in this case, a conversion table used to designate a predetermined route for each protocol is held in each router constituting the ASZ 310 so that each router of the ASZ 310 may determine a branch destination by referring to the conversion table.

Note that, although a constitution in which the communication control device 321 and the filter device 322 are provided in the ASZ 310A has been described in the second embodiment, also in the constitutions illustrated in the third embodiment and the fourth embodiment, the communication control device 321 and the filter device 322 may be provided in the ASZ 310B or the ASZ 310C as in the second embodiment.

Note that, in a packet forwarding in the ASY 210, the ASZ 310, and the ASB 410, the forwarding may be performed by referring to the set next hop for the routing information or the forwarding may be performed by referring to the set AS path for the routing information. Necessary information may be set as the routing information in accordance with the forwarding method.

Note that, although the communication control device 221 and the filter device 222 have been described as separated devices in the above description, the communication control device 221 and the filter device 222 may be constituted as an integral communication control device 223. Similarly, the communication control device 321 and the filter device 322 may be constituted as an integral communication control device 323.

Note that, although the router 212 and the filter device 222 have been described as separate devices in the above description, the filter device 222 may also have the function of the router 212. Similarly, in the case of the router 315 and the filter device 322, the filter device 322 may also have the function of the router 315.

Note that, although a case in which the network 600 and the network 600C are specific networks constituting the Internet has been described in the above description, the network 600 and the network 600C may be specific networks constituted of AS groups including one AS or a plurality of ASs.

Also, an address region in the network 100 configured to control a communication path using routing information designated from the ASY 210 is set in a range of an address region assigned as a network managed by the user, which is a range corresponding to the entire AS or a part in the AS managed by the user.

Note that, although a case in which the countermeasure function is activated in accordance with a change in traffic has been described in the above description, a communication path may he set to be branched constantly and the filter device 222 or the filter device 322 may be operated in an operational state at all times.

REFERENCE SIGNS LIST 100, 100A, 100B, 100C, 200, 200B, 200C Network
300, 300A, 300B, 300C, 400, 400C, 500 Network
600, 600C Network
110, 110A, 110B, 110C ASX
210, 210B, 210C ASY
310, 310A, 310B, 310C ASZ
410, 410C ASB
510 ASC
613, 614, 615 Router
221, 321 Communication control device
222, 322 Filter device
T12, T13 Tunnel

The invention claimed is:

1. A communication control method which performs route control in a communication system comprising:
a specific network;
a first network configured to accommodate a specific device connected to the specific network;
a second network provided between the specific network and the first network; and
a filter device configured to restrict communication according to a predetermined condition, the communication control method comprising:
causing a communication control device in the communication system to execute a communication route-setting process of, in accordance with routing information, for packets being transmitted from the specific network to the first network, defining a path leading from the specific network side to the first network to be branched in the second network, controlling the path such that a first path of the branched path is set as a path in which a packet leading to a predetermined address space including an address of the specific device leads to the first network via the filter device, and a second path of the branched path is set as a path leading to the first network in which the predetermined address space is excluded from an address space of the first network without passing through the filter device,
wherein the filter device is configured to determine whether an acquired packet is an aggressive communication packet, forward the acquired packet when the acquired packet is not an aggressive communication packet, and discard the acquired packet when the acquired packet is an aggressive communication packet, and
the second network is configured to determine whether to forward a packet received from the specific network to the first path or to the second path based on a transmission destination address of the received packet.

2. The communication control method according to claim 1, wherein
the filter device is accommodated in a third network provided in the first path;
the communication method further comprising:
causing the communication control device to perform control so that the communication leading to the specific device via the first path leads to the filter device.

3. The communication control method according to claim 1, wherein
the filter device is accommodated in the second network;
the communication method further comprising:
causing the communication control device to perform control so that the communication leading to the specific device via the first path leads to the filter device.

4. The communication control method according to claim 1, comprising:
in the communication route-setting process,
a process of causing the communication control device to output the following two types of routing information using a routing protocol configured to control a path between the specific network and the first network,
wherein first routing information includes address information indicating address space of the first network, and second routing information includes address information indicating a predetermined address space set to be narrower than the address space of the first network.

5. The communication control method according to claim 4, wherein the first routing information includes information used to designate a forwarding destination so that a packet received from the specific network is forwarded from the second network to a gateway belonging to a network different from a network in which the filter device is provided, and
the second routing information includes information used to designate a forwarding destination so that the received packet is forwarded to the filter device.

6. The communication control method according to claim 4, wherein the first routing information and the second routing information are transmitted from the third network provided in the first path.

7. The communication control method according to claim 4, wherein whether the second routing information is advertised on another network via the second network is selected in accordance with a network of a connection destination of the second network.

8. The communication control method according to claim 1, comprising:
a process of setting the route using information indicating a transmission source of the routing information as the first network.

9. The communication control method according to claim 2, wherein a tunnel is formed between the first network and the network in which the filter device is provided and a packet for communication via the filter device provided in the first path is forwarded from the third network to the first network via the tunnel.

10. The communication control method according to claim 1, wherein a network different from the network in which the filter device is provided is a network included in the second path leading to the first network.

11. The communication control method according to claim 1, wherein, when the first network and the second network are connected to each other via another network, information used to designate another network located between the first network and the second network is added to the routing information.

12. A communication control device which performs route control in a communication system comprising:
a specific network;
a first network configured to accommodate a specific device connected to the specific network;
a second network provided between the specific network and the first network; and a filter device having processing circuitry configured to restrict communication according to a predetermined condition, the communication control device comprising:

processing circuitry configured to in accordance with routing information, for packets being transmitted from the specific network to the first network, defining a path leading from the specific network side to the first network to be branched in the second network, control the path such that a first path of the branched path is set as a path in which a packet leading to a predetermined address space including an address of the specific device leads to the first network via the filter device; and set a second path of the branched path as a path leading to the first network in which the predetermined address space is excluded from an address space of the first network without passing through the filter device, wherein the filter device is configured to determine whether an acquired packet is an aggressive communication packet, forward the acquired packet when the acquired packet is not an aggressive communication packet, and discard the acquired packet when the acquired packet is an aggressive communication packet, and the second network is configured to determine whether to forward a packet received from the specific network to the first path or to the second path based on a transmission destination address of the received packet.

13. A non-transitory computer readable medium including a program causing a computer of a communication system comprising:

a specific network;

a first network configured to accommodate a specific device connected to the specific network;

a second network provided between the specific network and the first network; and a filter device configured to restrict communication according to a predetermined condition to execute a step of controlling a path in which, in accordance with routing information, for packets being transmitted from the specific network to the first network, defining a path leading from the specific network side to the first network to be branched in the second network, the path is controlled such that a first path of the branched path is set as a path in which a packet leading to a predetermined address space including an address of the specific device leads to the first network via the filter device, and a second path of the branched path is set as a path leading to the first network in which the predetermined address space is excluded from an address space of the first network without passing through the filter device, wherein the filter device is configured to determine whether an acquired packet is an aggressive communication packet, forward the acquired packet when the acquired packet is not an aggressive communication packet, and discard the acquired packet when the acquired packet is an aggressive communication packet, and the second network is configured to determine whether to forward a packet received from the specific network to the first path or to the second path based on a transmission destination address of the received packet.

* * * * *